United States Patent
Ding et al.

(10) Patent No.: US 12,001,007 B1
(45) Date of Patent: Jun. 4, 2024

(54) OPTICAL SCOPE ZERO STOP

(71) Applicant: Leapers, Inc., Livonia, MI (US)

(72) Inventors: Tai-lai Ding, Northville, MI (US); Yu-Hsiang Su, Zhubei (TW)

(73) Assignee: Leapers, Inc., Livonia, MI (US)

( * ) Notice: Subject to any disclaimer, the term of this patent is extended or adjusted under 35 U.S.C. 154(b) by 0 days.

(21) Appl. No.: 18/388,962

(22) Filed: Nov. 13, 2023

(51) Int. Cl.
*G02B 23/16* (2006.01)
*F41G 1/38* (2006.01)

(52) U.S. Cl.
CPC .............. *G02B 23/16* (2013.01); *F41G 1/38* (2013.01)

(58) Field of Classification Search
CPC ... F41G 1/38; F41G 1/387; F41G 1/16; F41G 1/18; G02B 7/16; G02B 23/14; G02B 23/16
USPC .......................................................... 42/122
See application file for complete search history.

(56) References Cited

U.S. PATENT DOCUMENTS

| | | | | |
|---|---|---|---|---|
| 5,513,440 | A * | 5/1996 | Murg | F41G 1/26 33/298 |
| 6,643,970 | B2 * | 11/2003 | Huber | F41G 1/38 42/122 |
| 6,691,447 | B1 * | 2/2004 | Otteman | F41G 1/38 42/129 |
| 7,640,830 | B2 * | 1/2010 | Bonis | F41G 1/38 74/813 L |
| 8,166,696 | B2 | 5/2012 | Hamilton | |
| 8,397,420 | B2 | 3/2013 | Hamilton | |
| 8,490,317 | B2 | 7/2013 | Adkins et al. | |
| 8,919,026 | B2 | 12/2014 | Hamilton | |
| 9,435,609 | B2 | 9/2016 | Hamilton | |
| 9,677,848 | B2 | 6/2017 | Hamilton | |
| 10,309,749 | B2 | 6/2019 | Hamilton | |
| 10,690,445 | B2 | 6/2020 | Hamilton | |
| 10,724,828 | B2 | 7/2020 | Hamilton | |
| 10,962,328 | B2 | 3/2021 | Hamilton | |
| 11,156,435 | B2 | 10/2021 | Hamilton | |
| 2006/0278035 | A1 * | 12/2006 | Casas | F41G 1/44 74/553 |
| 2008/0066364 | A1 * | 3/2008 | Klepp | F41G 1/38 42/122 |
| 2008/0236018 | A1 * | 10/2008 | Halverson | F41G 1/38 42/135 |
| 2019/0128644 | A1 * | 5/2019 | Tang | F41G 1/545 |
| 2020/0340782 | A1 | 10/2020 | Hamilton | |
| 2021/0239427 | A1 | 8/2021 | Hamilton | |

(Continued)

*Primary Examiner* — Joshua E Freeman
*Assistant Examiner* — Benjamin S Gomberg
(74) *Attorney, Agent, or Firm* — Warner Norcross + Judd LLP

(57) ABSTRACT

A turret for an optical scope including a base, a turret cover graspable by a user, a zero stop limiter, a zero stop ring extending around a guide groove, and a projection movable within the guide groove. The turret cover and the ring are operable in a zero stop setting mode in which these components rotate in unison about an axis of rotation, while the turret cover remains installed on the turret, so the projection moves in the guide groove until the projection engages the zero stop limiter to establish a zero stop. The turret cover can include a first interface element and the zero stop ring can include a second interface element that interface with one another so these components rotate in unison. The guide groove can be defined by a guide sleeve fixed to the base and threadably engaged with the ring.

20 Claims, 16 Drawing Sheets

(56) References Cited

U.S. PATENT DOCUMENTS

2021/0389553 A1    12/2021  Campbell et al.
2022/0042768 A1      2/2022  Hamilton
2022/0090879 A1*   3/2022  Walker .................... F41G 1/545

\* cited by examiner

OPTICAL SCOPE ZERO STOP

BACKGROUND OF THE INVENTION

The present invention relates to the optical sighting devices, and more particularly to an adjustment mechanism for an optical scope mountable to a weapon.

There are a variety of commercially available optical aiming devices used to align an associated weapon with a target during an aiming or shooting operation. One such device is an optical scope, which can be mounted to a weapon, such as a firearm, for example, a rifle. Most scopes include adjustment mechanisms in the form of turrets that provide for windage and elevation correction for a reticle or aiming element visible through the scope. The amount of available adjustment of such turrets to accommodate different shooting ranges, wind drift and other environmental conditions can vary from scope to scope and from one manufacturer to the next.

For example, many common turrets allow for multiple rotations of a dial so the scope can compensate for long range targets, after the scope was previously sighted in and zeroed at some preselected zero distance. A zero mark on a turret, for example, an elevation turret, can be determined when sighting in a weapon at a known distance. That zero mark can be selected when the impact point of the bullet matches the point on the target coincident with the optical center of a reticle inside the scope. The turret, of course, can provide up and down adjustment to the reticle which occurs when sighting in the weapon. The zero mark typically is set at a zero distance, which can be the shortest distance for which the weapon is sighted.

After sight in, and setting of the zero mark, a user may prefer to engage targets at greater distances than the zero distance. To properly accurately do so, the user can rotate the elevation turret to compensate for the greater amount of bullet drop over the longer distance. For example, a zero mark can correspond to a zero distance of 100 yards. To engage targets at a longer distance, such as 300 yards, a user will rotate the elevation turret a predetermined amount, often measured in minutes of angle (MOA) or mils, such that the reticle of the scope will properly align with a target at that longer distance so the weapon can engage the target with a projectile at the longer distance.

While this elevation adjustment is helpful for using the scope and weapon to accurately engage targets at various distances beyond the zero distance, it can create some issues. For example, a user might lose track of the number of rotations of the turret knob when dialing it away from the zero mark to engage targets beyond the zero distance, or conversely when dialing it toward the zero mark or some intermediate point. As another example, when the scope is used in low light, it may be difficult to monitor the number of rotations or see markings on the scope indicating rotation. Further, if the turret is inadvertently rotated, particularly in low light, it might be difficult to see the turret markings, so the user may not appreciate that the turret has moved.

Some manufacturers produce scopes having adjustable turrets with a zero stop that limits rotation of a turret and provides a mechanical indication corresponding to the zero mark so the user knows when the turret has been returned to zero. Thus, after a scope has been properly sighted in and the zero point determined, the zero stop can be set corresponding to that zero point. The rotational position of the turret at which the turret is stopped from further rotation corresponds to the zero point and thus the zero mark on the turret. While conventional zero stops work, they can have some issues. For example, such zero stops require a turret cap to be removed from the scope to access and set the zero stop mechanism. This can result in that cap being lost or misplaced, such that the scope is inoperable until it is found and replaced. In addition, dirt, debris, and water can enter the turret while the cap is removed. This can compromise the smooth operation and function of the turret after reassembly of the cap to the turret.

Several zero stop mechanisms use a vertically oriented post movable in a spiral groove that is machined into a horizontal plate. As the vertical pin moves through the horizontal groove, it moves away from a vertical axis of the turret, and can sometimes bind, causing odd tactile feedback. If debris enters the horizontally disposed groove, it can cause the rotation to feel gritty to the user, and in some cases, might bind the pin in the groove so the turret feels like it hit an end of the groove when it really did not.

Accordingly, there remains room for improvement in the field of scope adjustment mechanisms and in particular, precision zero stops.

SUMMARY OF THE INVENTION

A turret for an optical scope including a base, a turret cover graspable by a user, a zero stop limiter, a zero stop ring extending adjacent a guide groove, and a projection movable within the guide groove are provided. The turret cover and the ring are operable in a zero stop setting mode in which these components rotate about an axis of rotation, while the turret cover remains installed on the turret, so the projection moves in the guide groove until the projection engages or comes close to the zero stop limiter to establish a zero stop.

In one embodiment, the turret is operable in the zero stop setting mode in which the turret cover free spins relative to the base and an adjustment shaft of the turret, but remains mounted to the base, without being disassociated from it. The turret can be decoupled from the adjustment shaft via the loosening of one or more fasteners to attain this mode, but still remain part of the turret so that internals of the turret remain covered by the turret cover.

In another embodiment, the turret cover can include a first interface element and the zero stop ring can include a second interface element. These elements can interface with one another so these components rotate in unison about the axis of rotation.

In yet another embodiment, the interface elements can be in the form of a slot and a tab. The tab can be movably and/or slidably disposed in the slot. When the turret cover is grasped by a user and rotated, the tab and slot engage so that the zero stop ring rotates with the turret cover in unison about the axis of rotation.

In still another embodiment, the slot can be parallel to the axis of rotation. The tab can slide along or within the slot so that the zero stop ring moves axially along the axis of rotation while the turret cover remains stationary relative to the axis of rotation, not moving along it, but rather moving or rotating around it.

In yet another embodiment, the turret cover can define the slot and can include a cover upper surface. The zero stop ring can include a tab that is slidably disposed in the slot. The tab can slide in the slot with the tab moving away from the cover upper surface, as the turret cover and the zero stop ring rotate. The zero stop ring also can move away from the cover upper surface upon rotation.

In even another embodiment, the guide groove can be defined by a guide sleeve fixed to the base. The guide groove can circumferentiate the axis of rotation. The zero stop limiter can be joined with the zero stop ring and arranged relative to the guide groove so that the projection can engage the zero stop limiter to limit rotation of the turret cover.

In a further embodiment, the zero stop limiter can move along a helical path around the axis of rotation within the guide groove. The projection can include an interior end that glides over a groove bottom as the zero stop ring and the turret cover rotate in unison. The groove bottom can include at least a portion of a cylindrical shape that is centered on the axis of rotation.

In still a further embodiment, the zero stop limiter can project radially away from the axis of rotation. The zero stop limiter can be disposed adjacent the guide groove. The projection can be arranged to engage the zero stop limiter when moving along an arcuate path as the zero stop ring and the turret cover rotate about the axis of rotation. Axial travel of the turret cover can be limited upon such engagement.

In yet a further embodiment, the rotation of the turret cover threads the zero stop ring onto the guide sleeve so the zero stop ring and projection move toward the scope body as the projection rotates about the axis of rotation at a constant radial distance from the axis of rotation.

In even a further embodiment, rotation of the turret cover can thread the zero stop ring onto the guide sleeve so the zero stop ring and projection move toward the scope body as the projection rotates about the axis of rotation.

In another embodiment, the zero stop ring can include ring threads. The guide sleeve can include sleeve threads. The ring threads can thread to the sleeve threads. The turret cover can be unthreaded and slidably coupled to the zero stop ring so the turret cover and zero stop ring rotate in unison, with the zero stop ring moving axially relative to the turret cover.

In still another embodiment, a method of setting a zero stop of a weapon scope is provided. The method can include providing a turret comprising a base, a turret cover graspable by a user, a zero stop limiter immovable relative to the base, a zero stop ring circumferentiating a guide groove, and a projection movable within the guide groove; and rotating the turret cover and the zero stop ring in unison, while the turret cover remains coupled to the base, about an axis of rotation, so that the projection moves within the guide groove until the projection engages the zero stop limiter to establish a zero stop of the turret.

In yet another embodiment, the method can include moving the zero stop ring axially along the axis of rotation while the turret cover remains axially stationary along the axis of rotation and the turret cover and zero stop ring rotate about the axis of rotation.

In even another embodiment, the method can include moving a tab on the zero stop ring within a slot parallel to the axis of rotation and defined by the turret cover as the turret cover and zero stop ring rotate in unison. The tab and the slot are centered on a first zero mark indicia disposed on an exterior surface of the turret cover. The first zero mark indicia can pass a second zero mark indicia one or more times while the turret cover and the zero stop ring rotate in unison about the axis of rotation, and as the zero stop ring moves toward a scope body, while the turret cover remains a fixed distance from the scope body.

The current embodiments of the scope zero stop provide benefits in turret adjustments that previously have been unachievable. For example, where the turret cover is operable in the zero stop setting mode and remains mounted to the turret, the internals of the turret can remain shielded from the environment. The turret cover can remain disposed over the other components inside the turret, protecting them from dust, debris, moisture, and the like. This can increase the longevity of the action of the turret, and can provide precise, consistent adjustment to the scope, for example, setting of the zero stop. The zero stop ring projection and the zero stop limiter also can provide consistent and crisp zero stop setting. As a result, a user can confidently and quickly set such zero stop using the current turret. Further, the guide groove of the guide sleeve can be set up to provide a wide range of elevation or windage adjustment, yet still provide a good zero stop.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
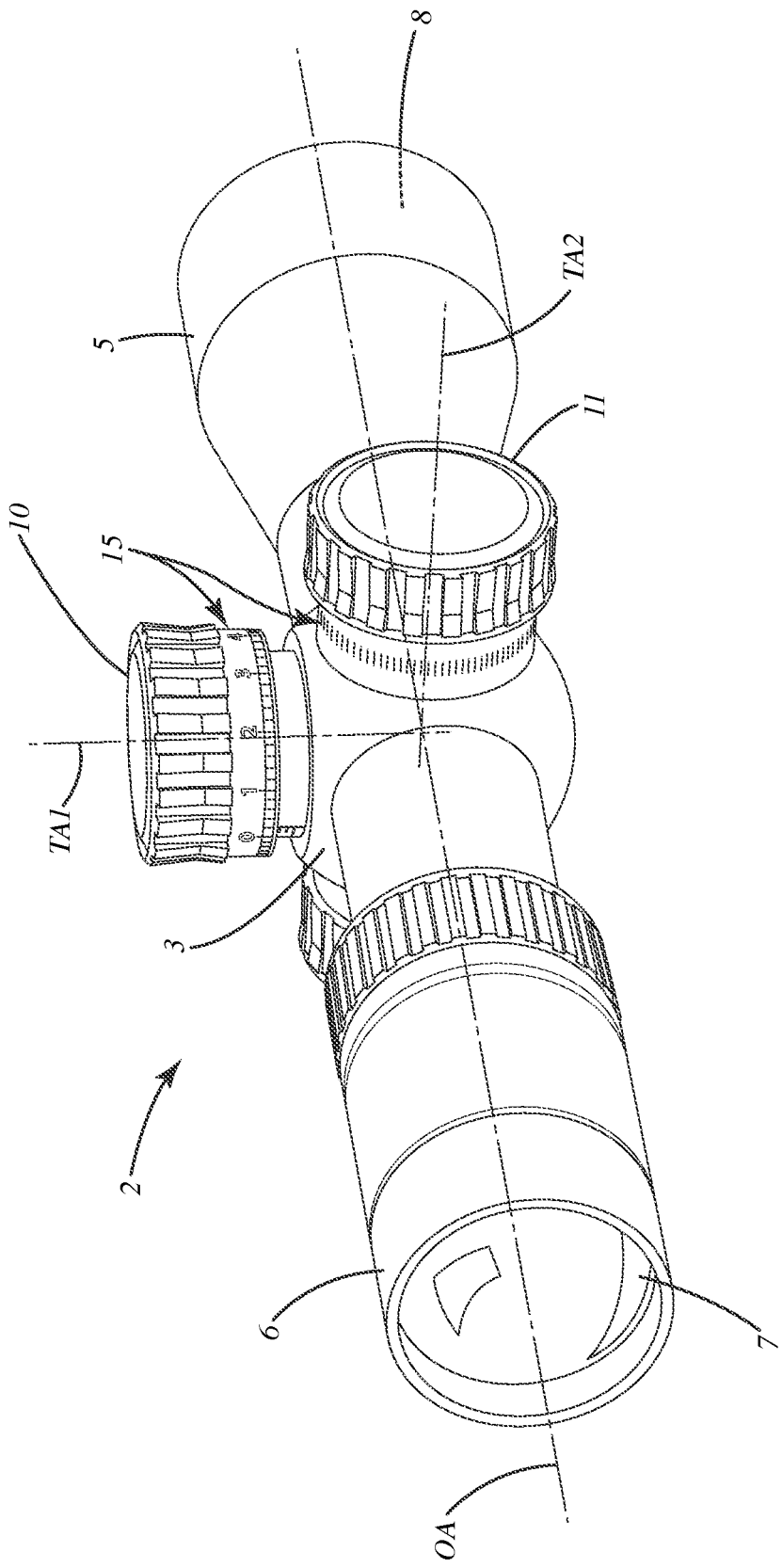
FIG. 1 is a perspective view of an optical scope including a turret of the current embodiment.
Figure 2:
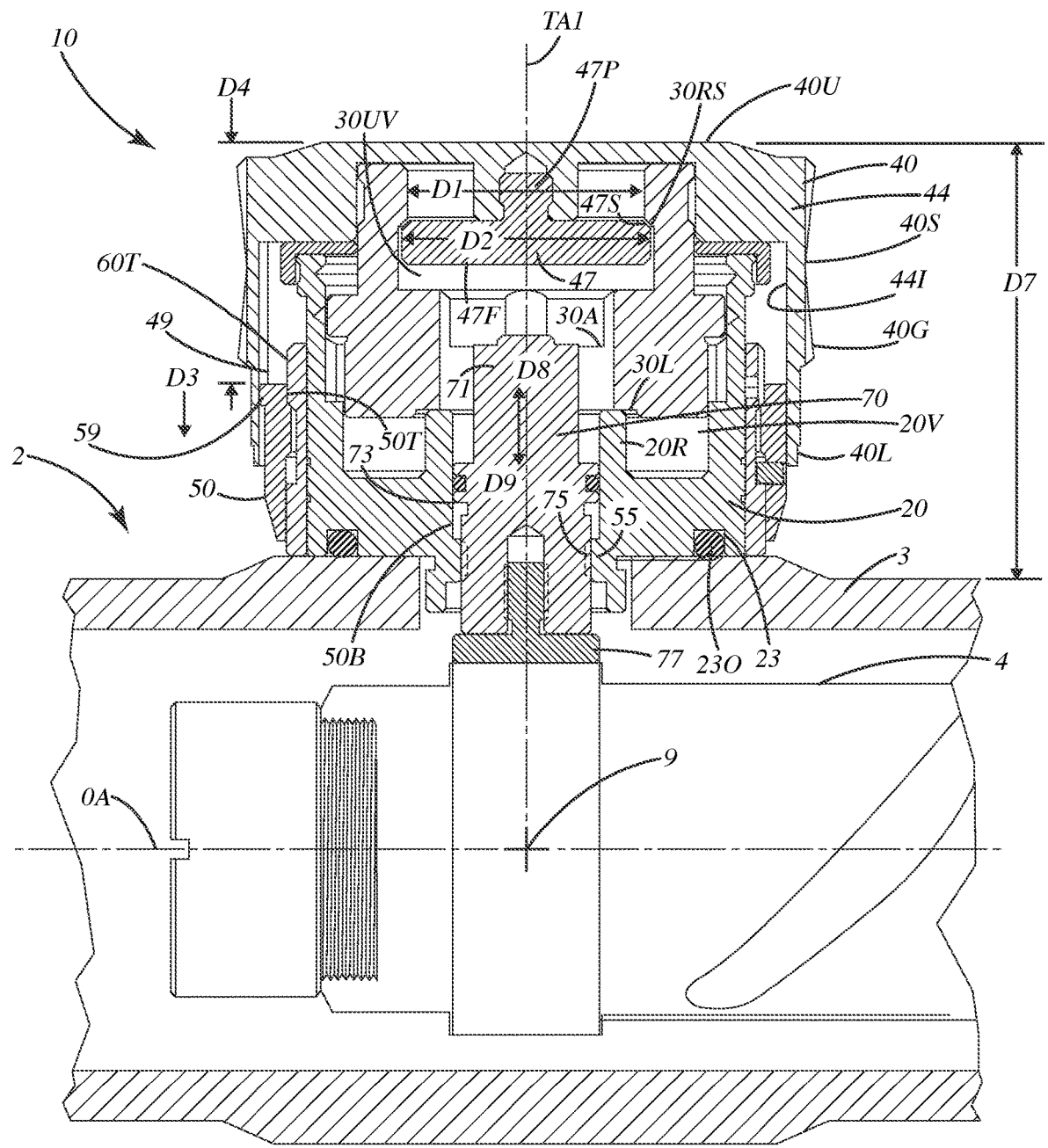
FIG. 2 is a section view of an elevation turret mounted to the scope.

A current embodiment of a scope including a turret of the current embodiment is shown in FIGS. 1-11, and generally designated 2. As shown in FIG. 1, the scope 2 can be an optical scope including one or more lenses inside a scope body 3. The scope can be referred to as a weapon scope, and can be mountable to a weapon, such as a firearm, for example a rifle, a handgun, a crossbow, or any other projectile firing device. The scope 2 and in particular the scope body 3 can enclose a movable optical element 4 as shown in FIG. 2, which can be an erector tube. The scope body 3 can be an elongated tube tapering from a larger opening at a forward end 5 to a smaller opening at a rearward end 6. The rearward end can include an eyepiece 7 and the forward end can include an objective lens 8. The center axis of the movable optical element defines the optical axis OA of the scope 2.

The scope can include an elevation turret 10 and a windage turret 11 in the form of rotatable knobs mounted to the center of the scope body 2. Each turret can be marked in increments by indicia elements 15 around their bodies or perimeters 14. These turrets can be similar or identical in construction in many ways and can be used to adjust the elevation and windage of the movable optical element to alter a point of impact of a projectile fired from the weapon to which the scope is mounted. The turrets can extend outward from the scope body at 12 o'clock and 3 o'clock and can be arranged so that their respective turret axes TA1 and TA2 are perpendicular to one another. Generally, only the elevation turret 10 will be described herein, as the windage turret 11 can be virtually identical.

In operation, the scope can be adjusted by rotating the turrets one or more clicks to change a point of impact of the projectile fired from the weapon to which the scope is mounted. In particular, the movable optical element 4 can be adjusted by rotating the turrets one or more clicks. A click can be a single tactile and/or audible adjustment increment on the elevation or windage turret of the scope, each of which can correspond to an indicia element 15 as described below. A single click optionally can alter a point of impact by ¼ inch at 100 yards, but a click may take on other values, such as ½ inch, 0.1 milliradian, or other increments depending on the application. In the illustrated embodiment, one click can correspond to an adjustment of the point of impact by ¼ Minute of Angle, or MOA, which is a unit of measurement of a circle, equivalent to 1.0472 inches at 100 yards. Typically, an MOA is equated to 1 inch at 100 yards, 2 inches at 200 yards, 5 inches at 500 yards, ½ inch at 50 yards and so on.

Figure 4:
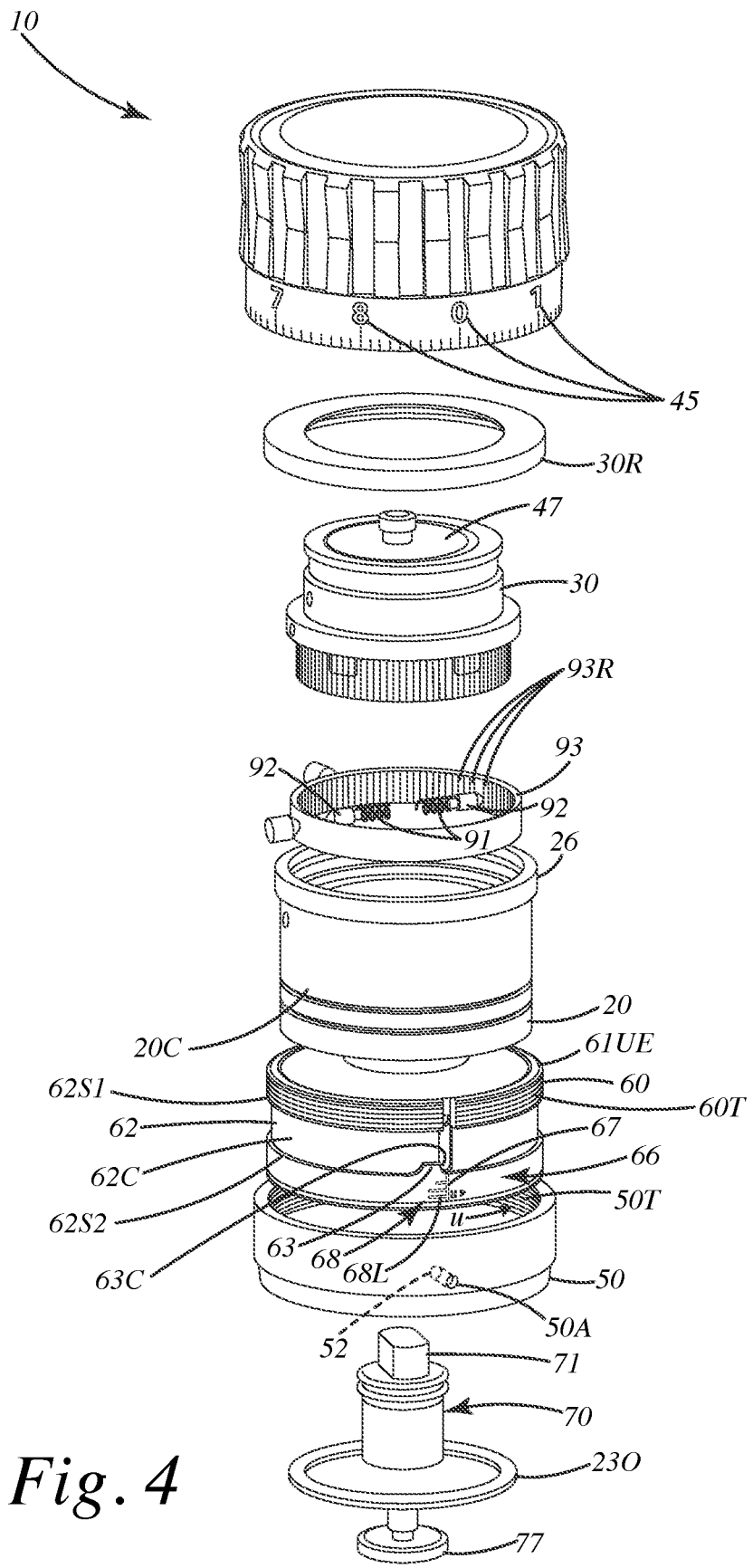
FIG. 4 is another exploded view of the turret.
Figure 11:
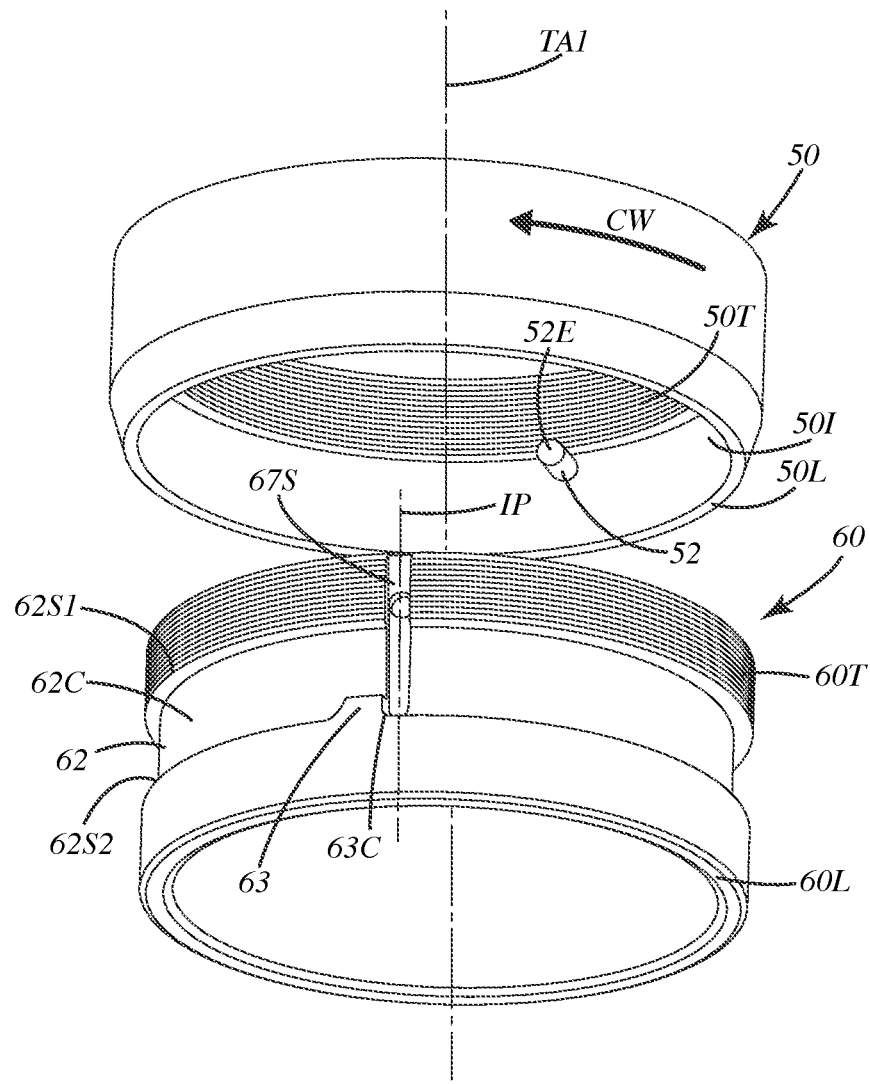
FIG. 11 is an exploded view of the zero stop ring and the guide sleeve in a zero stop offset configuration.

As mentioned above, the turrets can be adjusted one or more clicks. Such audible or tactile clicks can be generated by a clicker assembly 90 of the scope and turret 10 as shown in FIGS. 4 and 11. The clicker assembly 90 can come in a variety of configurations, but as shown, can be mounted between a collar assembly 30 and a base 20 of the turret, and can be configured to provide at least one of an audible click and a tactile click when the collar assembly 30 rotates relative to the base 20, which in turn informs a user that the turret has provided an adjustment to the moveable optical element 4 in FIG. 2 corresponding to the above MOA or MIL measurements. The clicker assembly 90 can include one or more springs or biasing elements 91 that urge or push respective one or more detents 92 toward a clicker ring 93 arranged and fixed to the base 20. The ring includes multiple ridges or splines 93S. The ends or tips 92T of the detents 92 can be rounded or conical, and can fit between the splines, and also ride over the tops of the splines. As the collar assembly 30 is rotated, for example when the turret 10 is adjusted for elevation, the tips 92T can ride over the splines, while the springs compress, then project radially outward again from the turret axis to snap or fit into a valley between adjacent splines, as the springs urge the detents radially outward from the axis TA1, thereby producing a tactile and/or audible click or other feedback to a user of the scope. Of course, other types and configurations of clicker assemblies can be used with the turrets described herein.

Returning to the construction of the turret 10, the base 20 can be a generally cylindrical body with a lower portion 21 that can define a groove 23 to accommodate a seal, such as an o-ring 230 extending around the axis TA1 to prevent liquid, dust and/or debris from entering the turret or the scope body. The lower portion 21 of the base can include a lower surface that is fitted against the scope body. The lower portion and base can be fixedly adhered, glued, cemented, welded, fastened, bonded, or otherwise secured to the scope body so that the base remains in a fixed position with respect to the scope body when the elevation turret is rotated. With this fixed connection, the turret base can be considered functionally unitary or integral with the scope body 3. This base and the turret are not removable from the scope body without damaging or functionally altering the turret or scope.

With reference to FIGS. 2-6, the turret 10 can include a turret cover 40 that is graspable by a user to manipulate and adjust the turret and thus the optical moveable body 4 within the scope body 3. The turret cover 40 can be rotatably joined with the base 20, and rotatable around the turret axis TA1, which also can correspond or be an axis of rotation defined by the turret 10. The turret cover 40 can include an upper wall 40U that can be generally circular and optionally can be free from any holes that extend completely therethrough. The upper wall 40U can transition to a side wall 40S which can extend around and circumferentiate the turret axis TA1. This sidewall 40S can be of a cylindrical shape and can extend downward to a lower edge 40L. The outer surface of the side wall 40S can include gripping ridges 40G that can allow a user to firmly grasp the cover 40 and rotate it about the turret axis TA1. The turret cover 40 as mentioned can be fully rotatable about the turret axis TA1.

The turret cover 40 can include multiple indicia elements 45, which can optionally be in the form of short vertical lines that extend downward adjacent to the lower edge 40L, around an outer perimeter of the turret cover. These indicia elements 45 can correspond to MOA or MIL markings or measurements such that a user can reference those indicia elements and correspond them to a satisfactory point of impact depending on adjustment of the turret cover, which can be attached to an adjustment shaft 70 and ultimately coupled to or engaging the optical body 4. The optical body 4 optionally can include a reticle, a dot, a chevron, an aiming point, or some other type of sighting element that can be aligned with a target that is cited through the scope. The sighting element may or may not be illuminated for viewing in low light. If it is, a light or other illumination mechanism (not shown) can be included in the scope.

Optionally, the sight indicia 45 can correspond to clicks of the elevation turret 10. The indicia can include click marks, each corresponding to a click, and larger click marks at selected intervals, as well as numerals indicating angle of adjustment or distance for bullet drop compensation. The indicia can be used for sighting in the scope and weapon, as well as adjusting the turrets to use the scope at ranges different from a zero range. The indicia can be used by the user to track the amount of adjustment, for example, up and down or left or right, made by the user adjusting the scope. After sighting in the scope and weapon, some of the indicia on the turret cover can face rearward toward a user as shown in FIG. 6, where a weapon has been sighted in but not undergone a zero setting mode as described below.

Figure 8:
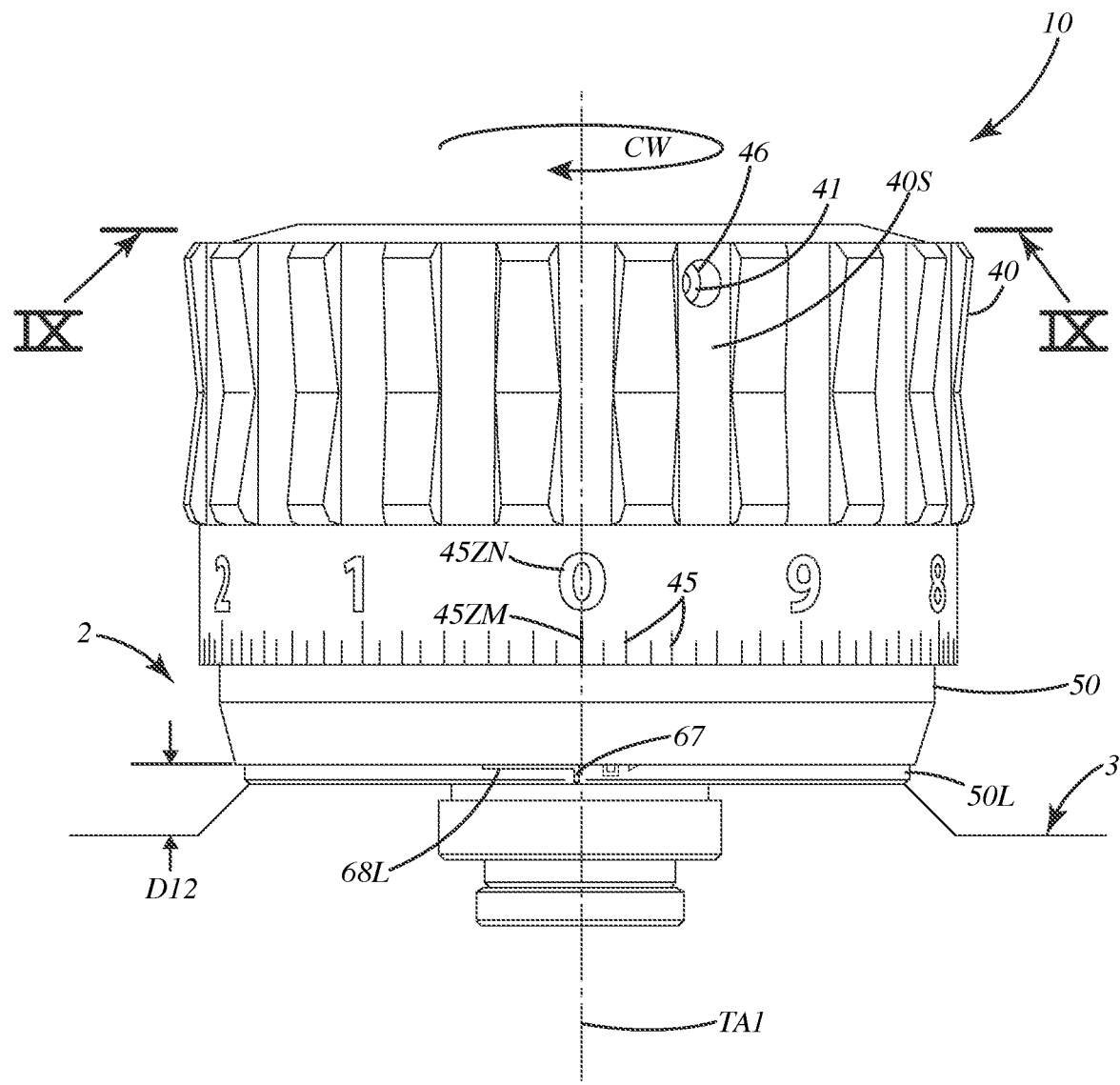
FIG. 8 is a rear view of the turret as the turret completes the zero stop setting mode.
Figure 9:
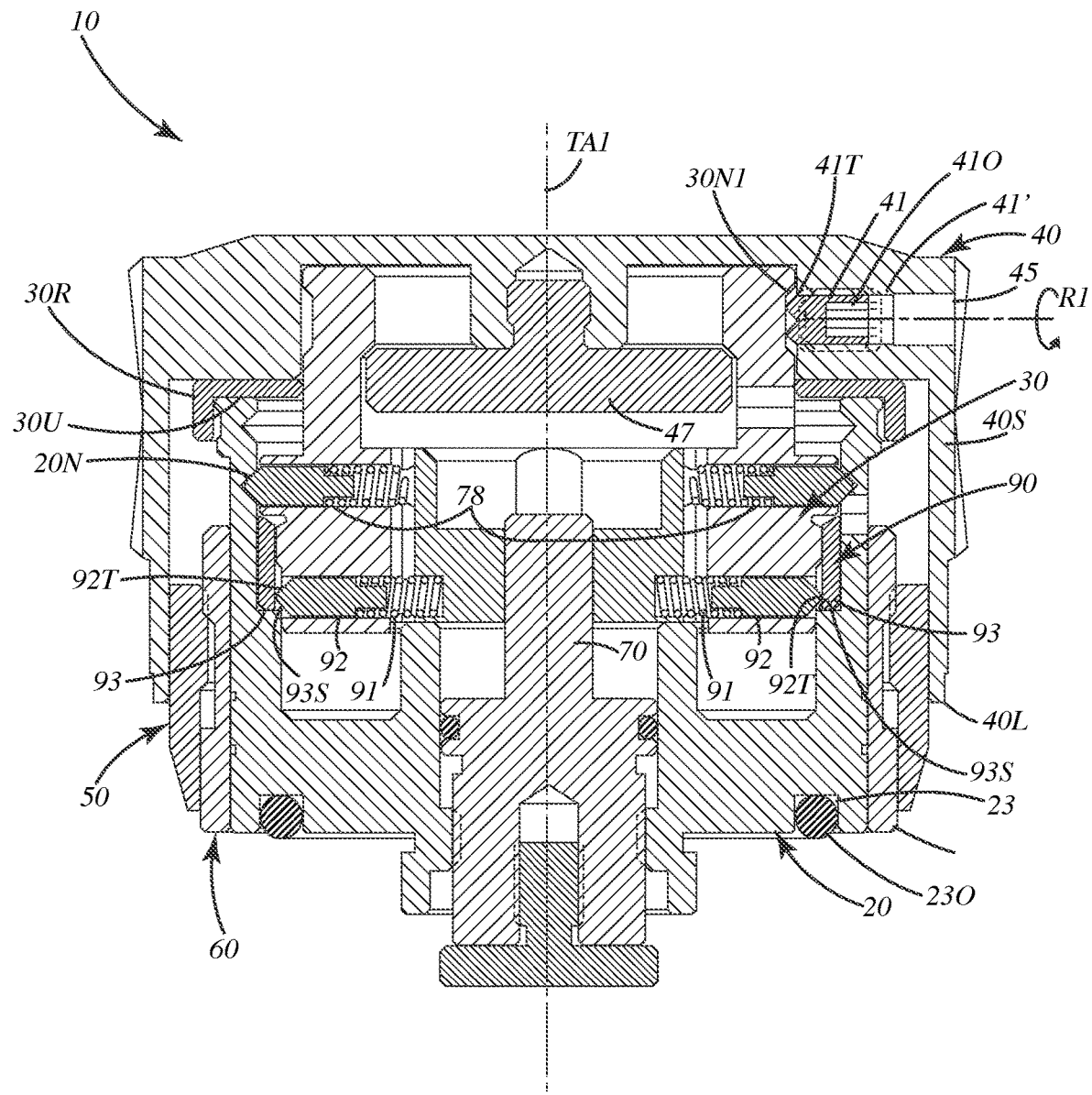
FIG. 9 is a cross section of the turret as the turret is in the zero stop setting mode taken along line 9-9 of FIG. 8, in which section a clicker assembly is shown.

The turret cover 40 as shown in FIGS. 8 and 9 can be joined with the collar assembly so that in an adjustment mode, it rotates in unison with collar assembly 30. For example, the sidewall 40S can define one or more fastener ports or apertures 46 that extend toward the axis of rotation TA1. These ports can be offset from one another and optionally can be threaded to receive a fastener 41. As shown in FIG. 9, the fastener 41 can be in the form of a set screw with a drive element such as a hexagonal or star shaped opening 41O that can be engaged by a tool of the same shape. The fastener can be rotated in direction R1 to disengage the tip 41T from a notch 30N1 of the collar assembly 30. When the tip and fastener is disengaged from the notch 30N1, for example, when the screw is loosened, or some other portion of the collar, the turret cover 40 can free spin relative to the collar assembly 30, as well as the adjustment shaft 70 as described further below. For example, as shown in broken lines, the fastener 41 can be disengaged from the notch 30N1, allowing the cover 40 to rotate freely relative to the collar assembly so that the two do not rotate together. When the fastener is retightened as shown in solid, it engages the collar assembly so that the cover and collar can rotate together or in unison relative to the base 20, thus rotating the adjustment shaft 70 and ultimately providing adjustment to the body 4 inside the scope body 3. This in turn moves the sighting element 9 and adjusts a point of impact of a projectile fired from the weapon to which the scope is secured. There can be one or more additional fasteners that secure the turret cover 40 to the collar assembly 30 in a rigid and fixed manner so that they rotate in unison or together with one another. Further, the fastener can be substituted with a clamp, a cam, a pin, or some other mechanism that secures the turret cover to the collar assembly so that they rotate together.

Figure 6:
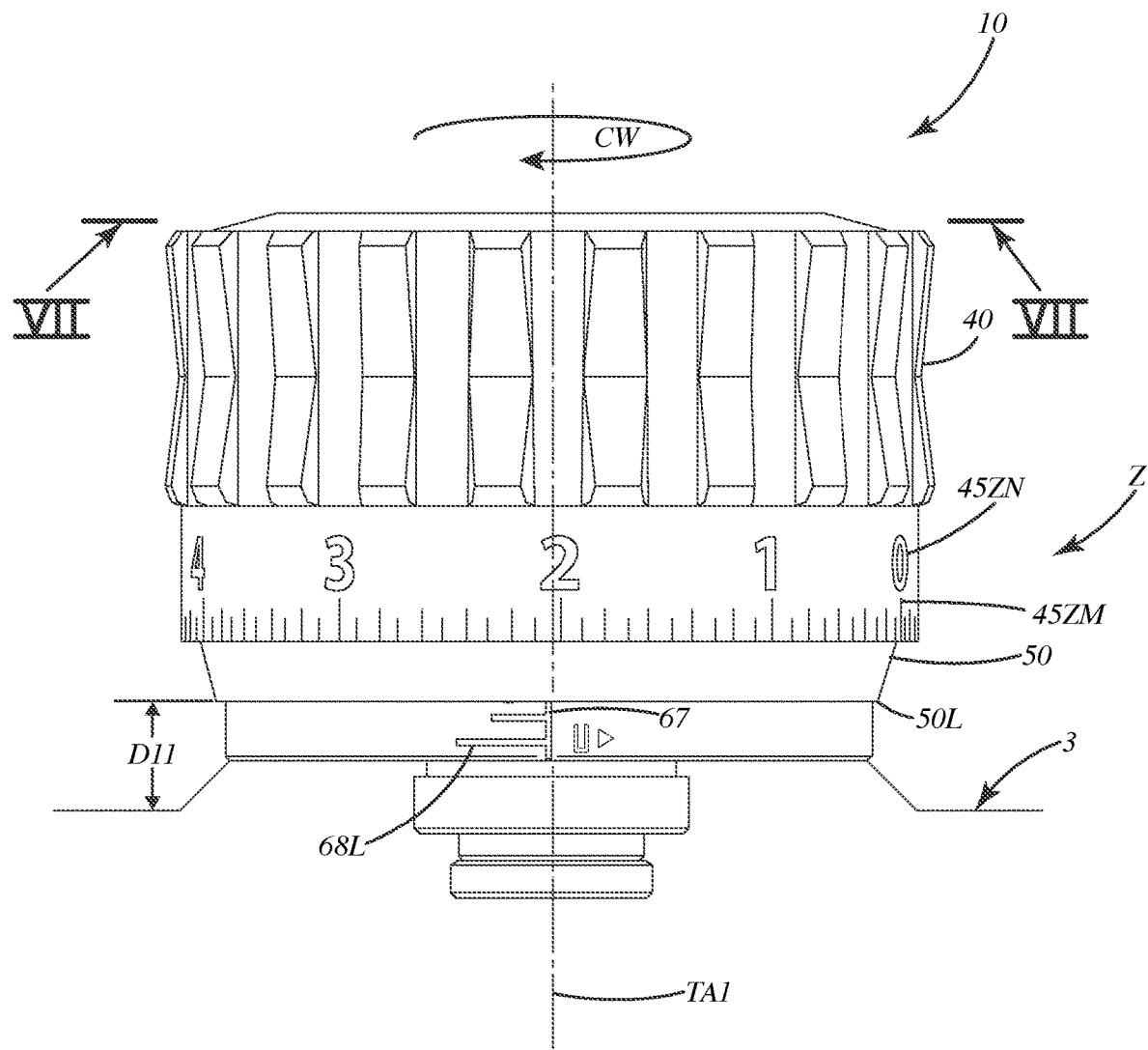
FIG. 6 is a rear view of the turret after the scope has been adjusted during sight in, before the turret initiates a zero stop setting mode.

As shown in FIGS. 2 and 6, the turret cover 40 can be secured to a cover retainer 47. This retainer can engage the turret cover and the collar assembly such that the turret cover cannot be removed from the collar assembly 30 without the use of tools, so that a user cannot normally remove the turret cover from the collar assembly and the remainder of the turret. Thus, the turret cover remains installed relative to the collar assembly, the base, as well as the adjustment shaft 70. Optionally, due to this construction, disassembly of the turret cover relative to the base and collar assembly can be performed by a serviced technician with a special tool and/or an original equipment manufacturer, rather than the user. In this manner, the turret cover 40 can remain always and permanently installed relative to the turret to protect the internals of the turret 10 from liquids, debris, dirt, and other items that might impair the function and operation of those internal components.

Optionally, the turret cover 40 can be joined with a cover retainer 47 such that the turret cover cannot be removed from the collar assembly 30 and/or the base 20 without the use of tools, such that the turret cover remains joined with the base during a zero stop setting mode of the turret. In this zero stop setting mode, the turret cover can free spin relative to the adjustment shaft 70 such that the adjustment shaft remains stationary relative to the base and scope body, not moving the body 4, and such that the rotation of the turret cover rotates the zero stop ring until the projection engages the zero stop limiter as described below.

The cover retainer 47 can be disposed in an upper void 30UV of the collar assembly 30 as shown in FIG. 2. The cover retainer can be threaded, bonded, adhered, welded to or otherwise joined with the upper wall 40U of the cover 40. The retainer can include a plate or flange 47F extending to an outer sidewall 47S as well as post 47P extending from the upper portion of the flange portion. The outer sidewall or outer perimeter 47S of the cover retainer 47 can engage a shoulder 30RS of the void 30UV. The diameter or dimension D1 of the void 30UV above the shoulder 30RS can be less than the diameter or dimension D2 of the flange or plate 47F of the cover retainer 47. Accordingly, the cover retainer cannot be pulled out from the void 30UV, and accordingly, the cover 40 cannot be removed from the collar and thus the base. Other structures and mechanisms can be used to secure the turret cover 40 to the collar assembly 30, allowing the turret cover to rotate freely relative to the cover assembly, but not be removed from the collar assembly without damaging a portion of the turret if so designed. Of course, in other applications, sometimes the cover 40 can include a quick release mechanism or some other structure that allows it to be removed from the collar assembly temporarily, but typically not in a zero stop setting mode as described below.

The turret cover 40 can include a turret housing having an inner housing surface 44I. This inner housing surface 44I optionally can be a cylindrical inner surface of the sidewall 40S of the turret cover 40. The turret cover can include a first interface element 49 optionally disposed on the inner housing surface or somewhere along the sidewall 40SW turret cover 40. This first interface element can interface with a second interface element 59 that is included on the zero stop ring 50 as described below. The first interface element 49 and second interface element 59 can interface, engage, nest, fit together, lock, or otherwise contact one another so that the turret cover 40 and the zero stop ring 50 rotate in unison about the turret axis TA1. By rotating in unison, it is meant that when the turret cover 40 is rotated, the interfaces contact, engage, or touch one another so that rotation of the turret cover 40 also rotates the zero stop ring 50 with the turret cover. This rotation can be simultaneous so that they rotate equal amounts about the axis of rotation and/or the turret axis TA1. Optionally, the turret cover can be unthreaded or generally can include no threads that interface or couple to other components of the turret.

Figure 5:
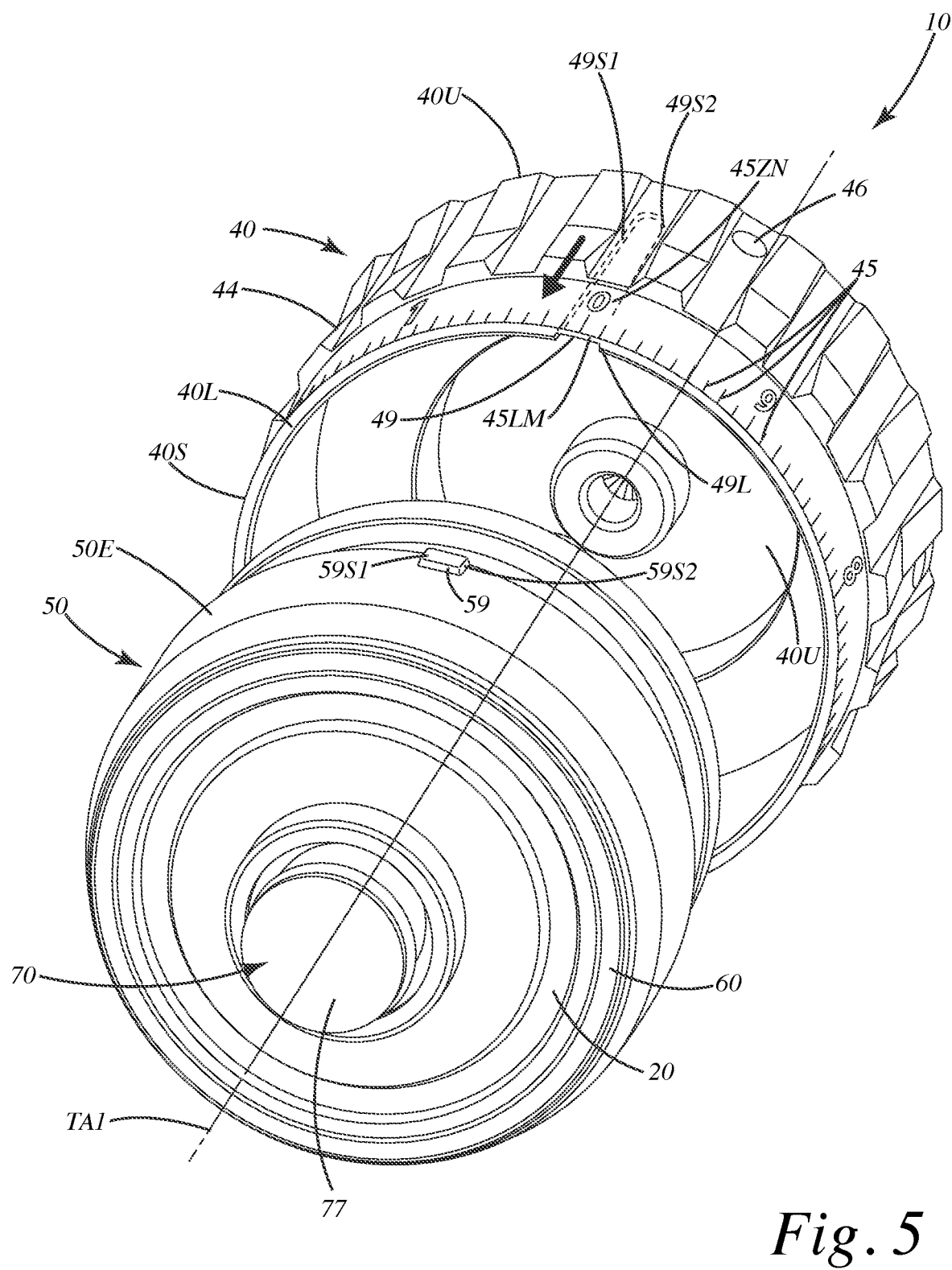
FIG. 5 is a partially exploded view of the turret showing structural interfaces of a turret and a zero stop ring that allow these components to rotate in unison, while the zero stop ring moves axially.

As shown in FIGS. 5 and 9, the first interface 49 can be in the form of a slot, which can be any linear guide, such as a wall, a shoulder, a flange, opposing walls bounding a central region, a slit, a recess, a hole, an edge, a rim or other feature that engages the second interface 59. The slot 49 shown optionally can include first and second side walls 49S1 and 49S2 and a lower entry 49L that is defined by the lower edge 40L of the turret cover housing 44. With this lower entry, the second interface 59 can be moved or slid into and move within the slot 49. Either one of the sidewalls 49S1 and/or 49S2 can be configured to engage the second interface 59, which as shown can be in the form of a tab, projection tab or other protrusion extending from an exterior 50E of the zero stop ring. Either of the sides 59S1 or 59S2 of the second interface 59 can engage either of the sidewalls 49S1 or 49S2 depending on the direction of rotation of the turret cover 40 relative to the base 20 and remainder of the turret 10. Although the current embodiment illustrates that the turret cover 40 includes the slot 49 and the zero stop ring 50 includes the tab 59, these components can be reversed depending on the application. Further, other types of interfaces can be used so that the cover and zero stop ring rotate in unison, with the turret cover disconnected and/or decoupled from the adjustment shaft 70. For example, the components might be joined with one another via a set screw that can be tightened or adjusted to provide a selective coupling between the turret cover 40 and the stop ring 50 so that they rotate in unison. Further, in other constructions, the slot 49 may be curved or angled relative to the axis of rotation TA1. In other cases, the slot 49 may be offset relative to the axis of rotation as well as the tab.

Figure 16:
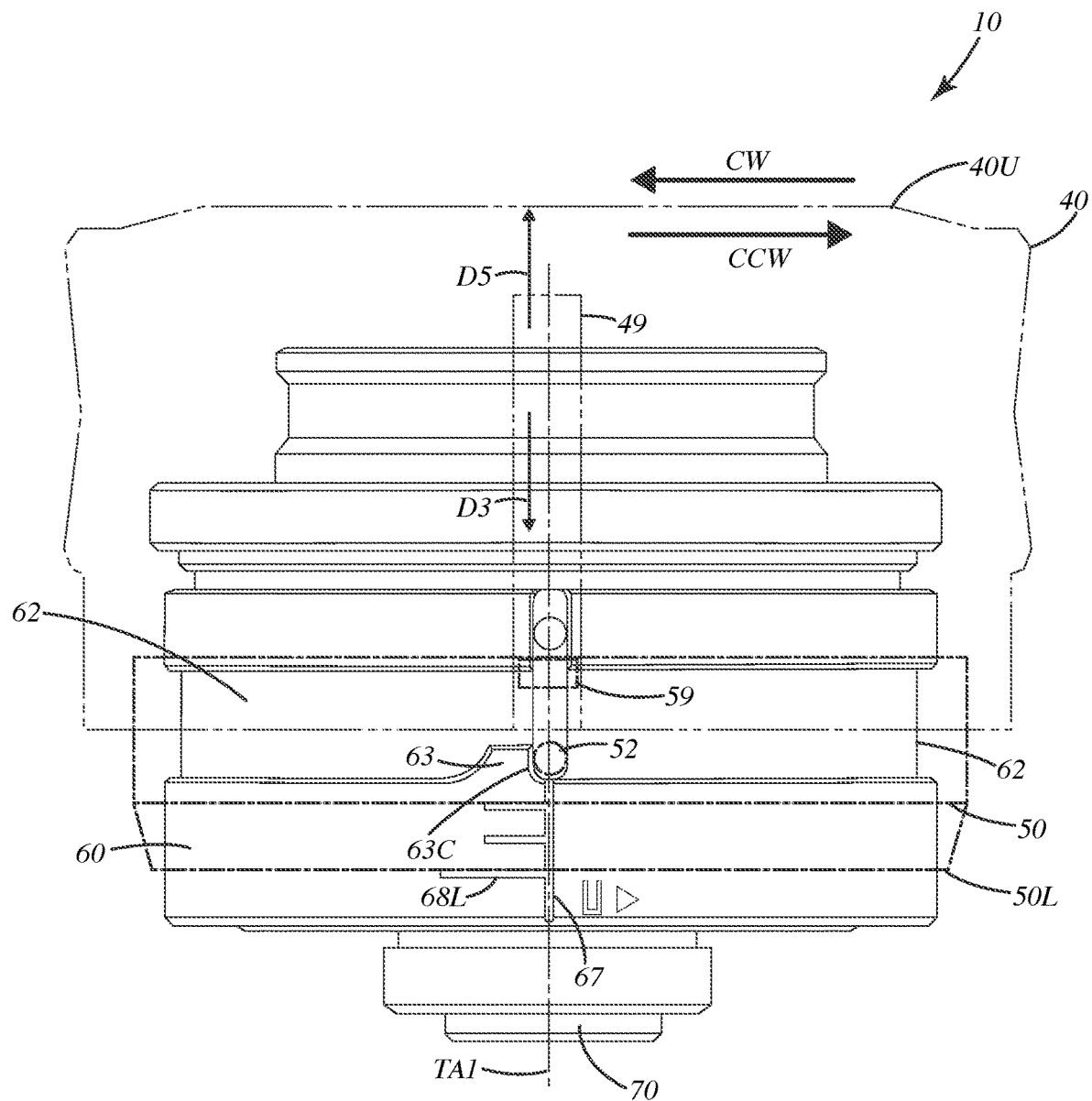
FIG. 16 is a partial section view of the turret at a completion of the zero stop setting mode.

In a zero stop setting mode, the first and second interfaces engage such that rotation of the turret cover rotates the zero stop ring simultaneously. This can occur until the projection of the zero stop ring as described below engages a zero stop limiter as described below to set the zero stop. The tab 59 optionally can be slidably or moveably disposed in the slot 49 and can move in a direction D3 away from the upper surface 40U of the turret cover 40 during a zero stop setting mode. For example, as shown in FIG. 2, during a zero stop setting mode, the tab 59 can move downward in direction D3 away from the upper surface 40U and generally toward the scope body 3. As this movement occurs, the tab 59 can move farther and farther away from the upper surface 40U. As another example, comparing FIGS. 2 and 16, FIG. 2 illustrates the initiation of a zero setting mode. There the tab 59 is disposed in the slot and located a distance D4 from the upper surface 40U. As the turret cover is rotated, the zero stop ring 50 rotates in unison with the turret cover. Because the turret cover 40 does not move axially along the axis of rotation TA1, but the zero stop ring does move along the axis of rotation TA1, the tab 59 moves away from the upper surface 40U generally toward the scope body 3. At the end of the zero stop setting mode shown in FIG. 16, the tab 59 has moved within the slot 49 until it is a distance D5 from the upper surface 40U of the turret cover 40. This distance D5 can be greater than the distance D4. Further, as the tab 59 moves away from the upper surface 40U, that upper surface 40U can remain a constant and fixed distance D7 from the scope body 3, without moving axially along the axis TA1. The tab 59 however, moves toward that scope body 3 such that the distance between it and the scope body decreases as the turret is adjusted in the zero setting mode toward the zero stop as described below.

Optionally, the tab 59 is configured to move axially adjacent but offset from the axis of rotation TA1 within the slot 49 of the turret cover 40. This axial movement is prompted by the tab 59 being engaged by the shoulders or side walls of the slot 49 and moving the tab along with the slot as the cover 40 rotates about the axis of rotation. The turret cover 40 and the zero stop ring 50 rotate together due to the interaction of the tab in the slot. Again, during this rotation, the tab can slide axially within the slot, optionally parallel to the axis of rotation TA1, until the zero stop ring engages the zero stop limiter as described below to set the zero stop.

As mentioned above, the turret cover 40 during the zero stop setting mode is decoupled from the collar assembly 30 and thus the base 20. Accordingly, the collar assembly does not rotate about the axis of rotation TA1. The collar assembly, which is rotationally and fixedly secured to the adjustment shaft 70, thus does not rotate the adjustment shaft 70. The collar assembly 30 can be disposed in a void 20V of the base 20 as shown in FIG. 2. This void 20V can include a support ring 20R upon which a lower surface 30L of the collar assembly rides and rotates. The collar assembly also can define the aperture 30A into which a portion 71 of the adjustment shaft 70 fits. The aperture 30A and portion 71 can be shaped of corresponding shapes, for example, ovals, polygons or the like such that rotation of the collar assembly rotates the adjustment shaft 70. The shaft 70 can extend downward to a bearing support portion 73 seated within the bore 20B of the base 20 such that the adjustment shaft 70 rotates consistently and evenly within that bore.

With further reference to FIG. 2, the base 20 can further include the threaded portion 55 that receives a corresponding threaded portion 75 of the adjustment shaft 70. When the base threaded portion 75 is rotated relative to the threaded portion 55, the adjustment shaft 70 can move in directions D8 or D9 axially along the turret access TA1, depending on the direction of rotation. As a result, the contact portion or head 77 of the adjustment shaft 70 can engage the movable body 4 within the scope 2 subsequently moving the sighting element 9 to alter the point of impact of a projectile shot from a weapon to which the scope 2 is joined. Optionally, the portion 71 with the adjustment shaft 70 can move axially along the turret access TA1, within the aperture 30A of the collar 30 during the movement in directions D8 or D9. This portion 71 can be in the form of a paddle received in a similarly shaped aperture 30A, but can slide and move relative to that aperture and the collar assembly in general.

As shown in FIG. 9, the collar assembly 30 can be removably mounted to the base 70 via spring operated detents 78 that can engage a corresponding notch 20N defined by the upper portion of the collar assembly. The collar assembly further can include a low friction ring 30R that is disposed above the upper rim 30U of the collar assembly. This low friction ring 30R can be constructed from low friction materials such as polymers, polished steel, carbon composites, or some other material. This can facilitate consistent and easy rotation of the turret cover 40 relative to the caller assembly 30 when the two are rotationally decoupled from one another, but while the turret cover 40 remains secured to the collar assembly via the cover retainer 47 shown there.

Figure 3:
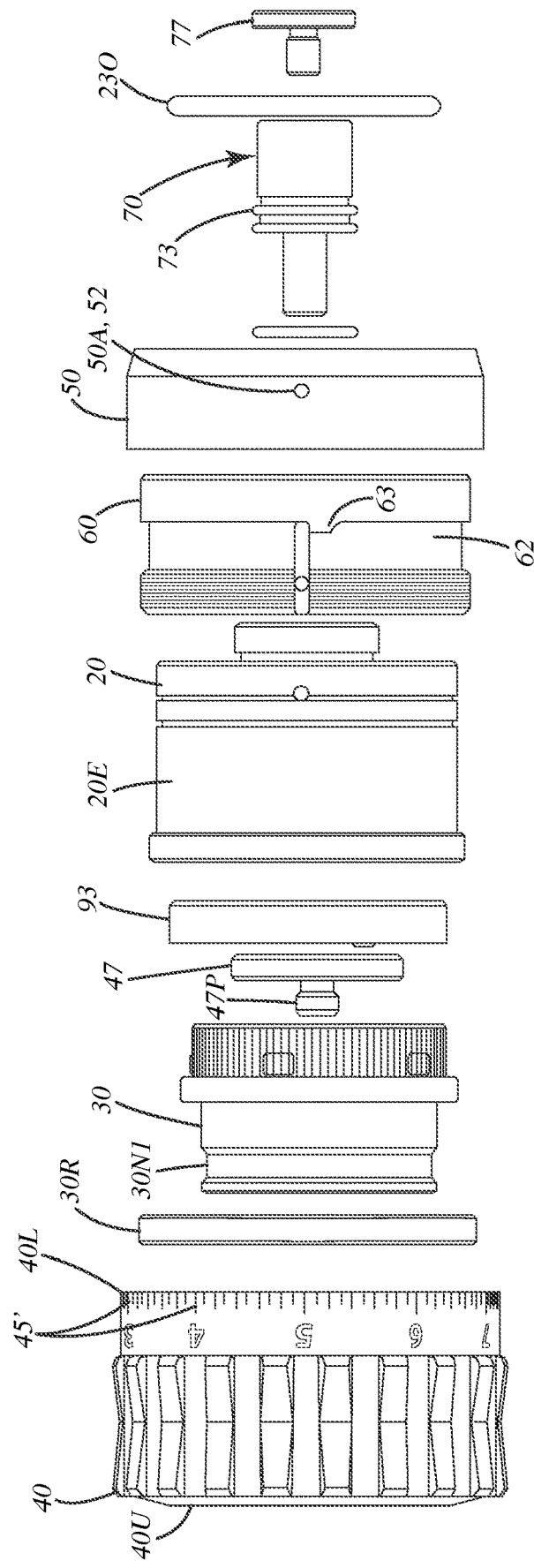
FIG. 3 is an exploded view of the turret.

With further reference to FIGS. 2-4, as mentioned above, the collar assembly 30 can be mounted in a void 20V defined by the base 20. The base 20 can include an outer surface 20E, about which a guide sleeve 60 can be disposed. Generally, the guide sleeve 60 can extend around the axis of rotation and/or the turret axis TA1. Although shown as a separate component, the guide sleeve can be integral with and/or formed with the base 20. As shown, however, the guide sleeve can be a generally tubular guide shaped structure that fits around the base 20 and its exterior 20E. The base 20 exterior can form an outer perimeter, distal from the axis of rotation. The guide sleeve can be disposed around that outer perimeter and can be fixed thereto. The guide sleeve 60 can be further located via an upper rim 26 of the base such that the upper edge 61UE abuts that rim 26. The guide sleeve can be secured to the base so it does not rotate relative to the base. Optionally, the guide sleeve 60 can be adhered, glued, cemented, welded, fastened, or otherwise fixed in a stationary manner relative to the base. Thus, when the base 20 is secured to the scope body, both the base of the guide sleeve are disposed in a fixed, permanent position relative to the scope body.

Optionally, as shown in FIGS. 4 and 6, the guide sleeve 60 can include lap indicia 66 including a lap count indicator base indicia 67 which can be a generally vertical line that is aligned with the axis of rotation TA1. This indicator base indicia 67 can be generally perpendicular to lab count indicia 68 which extends outwardly from the base indicia 67 marked on the sleeve. This lab count base indicia 67 can correspond to a number of rotations that the turret cover is rotated relative to a zero stop as described below. The indicia 66 also can include a lowermost lap count indicia 68L, which corresponds to the first lap starting rotation of the turret cover beyond the zero stop.

As shown in FIG. 8, when the turret 10 is adjusted such that the turret cover 40 is disposed at the zero stop, the zero stop number 45ZN and the associated zero stop marking 45ZM can be aligned with the lap count indicator base indicia 67. This in turn indicates to a user that the turret 10 and the turret cover 40 is set at a zero stop point. Further, the lower edge 50L of the ring can be aligned and parallel with the lowermost lap counter 68L to indicate to a user the turret is at the zero stop setting.

As further shown in FIGS. 3-4 and 11-12, the guide sleeve 60 can extend around the axis of rotation TA1. The guide sleeve 60 can define a guide groove 62 that optionally circumferentiates the guide sleeve and the axis of rotation. The guide groove 62 can be at least partially defined by a cylindrical outer surface shape 62C. The cylindrical shape can form a cylindrical groove bottom that circumferentiates the axis of rotation TA1. The guide groove 62 can be bounded by an upper shoulder 62S1 and a lower shoulder 62S2.

As mentioned above, the turret 10 can include a zero stop limiter 63. This zero stop limiter 63 can be arranged relative to the guide groove 62 such that a projection 52 can engage the zero stop limiter to limit rotation of the zero stop ring 50 and the turret cover 40 in the zero stop setting mode or in an adjustment mode as described below. When this occurs, the zero stop markings 45ZN and 45ZM can be aligned with the lap counter base indicia 67. The user thus can be confident that the turret cover has been returned to its zero stop at which the scope was sighted in with the weapon at a zero point.

Figure 10:
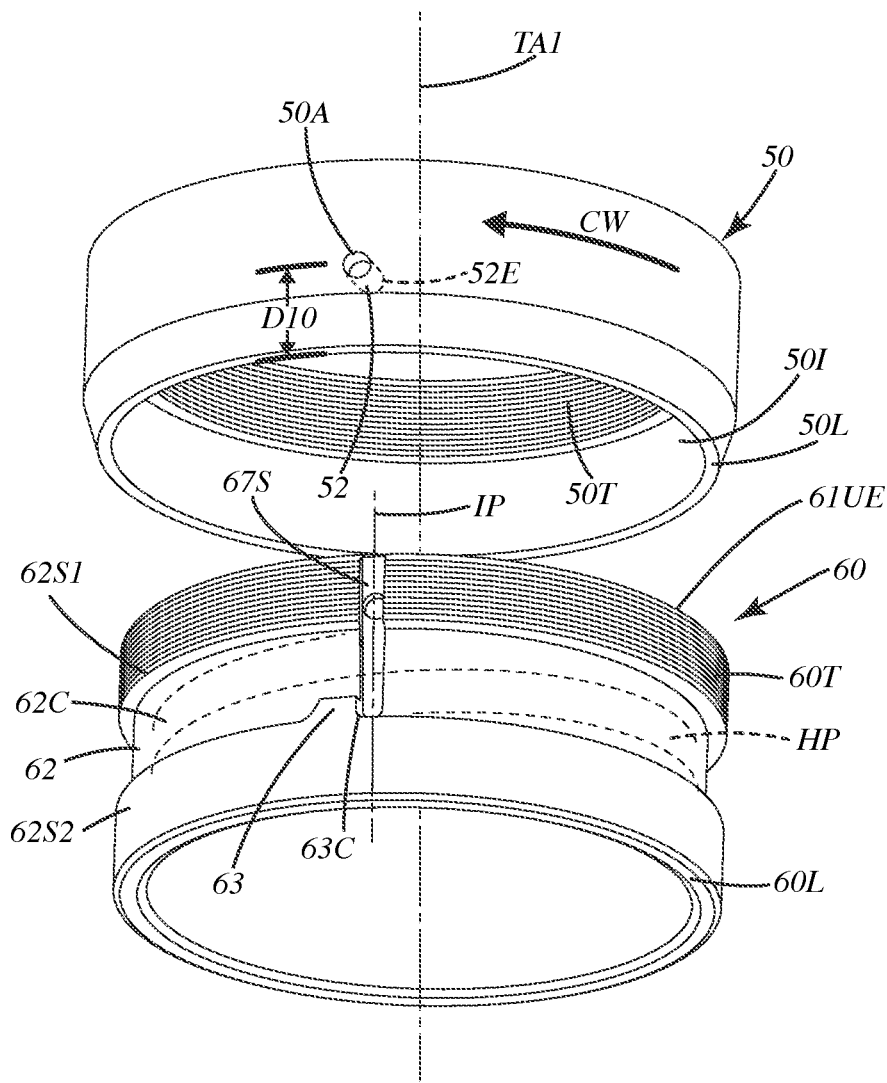
FIG. 10 is an exploded view of the zero stop ring and the guide sleeve in a zero stop alignment configuration.

As shown in FIG. 10, the zero stop limiter 63 can be in the form of a shoulder or tab that projects outwardly from the axis of rotation TA1 of the turret 10, beyond the bottom of the groove, such that the limiter can engage the projection. The zero stop limiter 63 can extend farther away from the axis of rotation radially than the bottom of the groove 62C. The zero stop limiter 63 also can be disposed in at least a portion of the path of the projection 52 as it rotates about the axis of rotation TA1. The zero stop limiter can project radially outward, away from the axis of rotation TA1. The projection 52 which can project radially inward toward the axis of rotation TA1, can be disposed such that as it travels within the groove 62, circumferentiating the axis of rotation TA1, until it eventually contacts and is limited in movement by the zero stop limiter 63. This can occur when the projection 52 engages a contact surface 63C of the zero stop limiter 63. Again, upon this engagement, the zero stop limiter can limit rotation of the turret cover.

Figure 12:
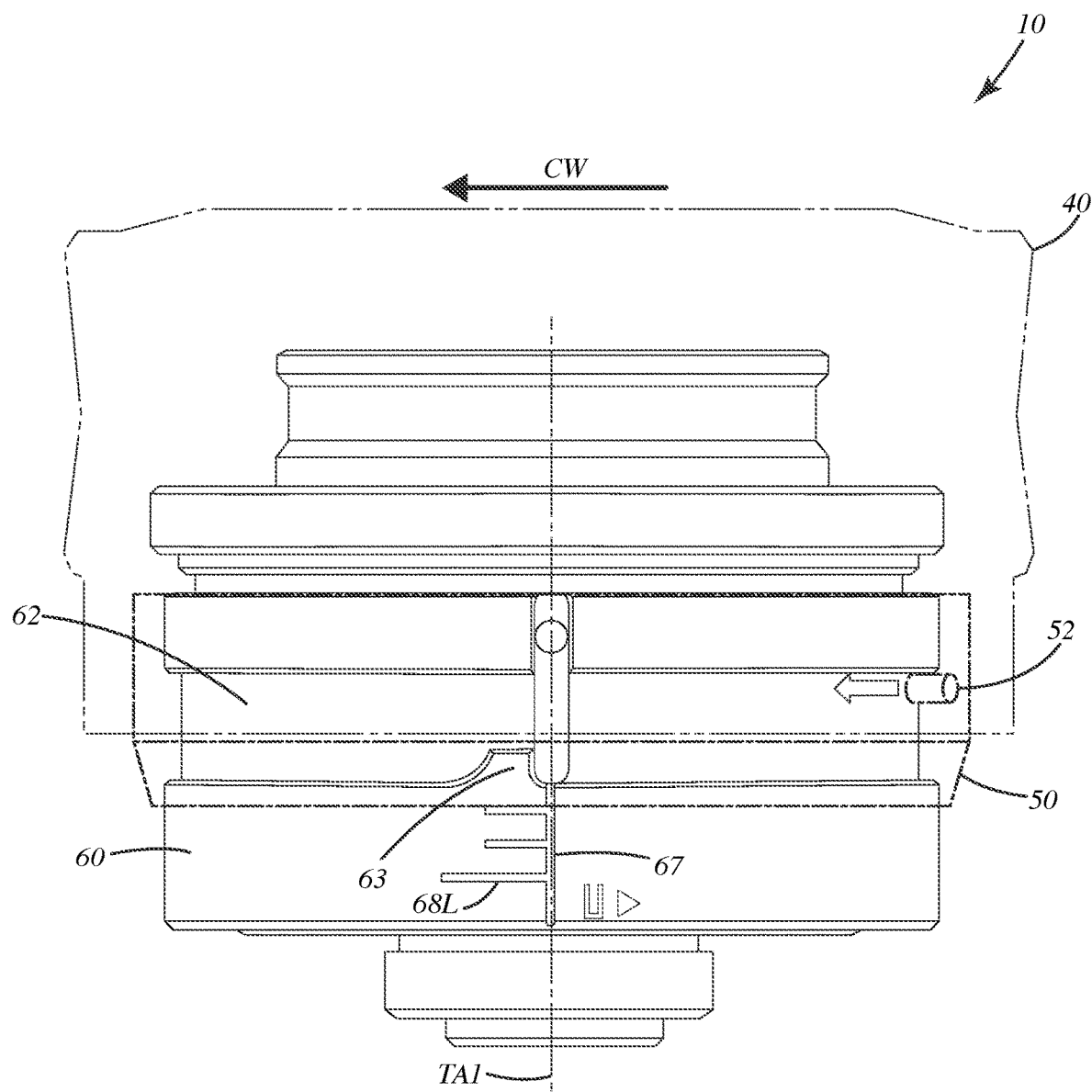
FIG. 12 is a partial section view of the turret initiating a zero stop setting mode.

As shown in FIGS. 11 and 12, the zero stop ring 50 can include the projection 52. This projection can be in the form of a pin that extends radially inward toward the axis of rotation TA1. The pin can be integrally formed with the zero stop ring, or can be seated in a pin aperture 50A defined by the zero stop ring 50. The pin can be of a cylindrical shape as shown, however, it alternatively can be in other shapes, such as a polygonal rod or bar that extends inward from the interior 50I of the ring 50. In some cases, the pin can be in the form of a set screw or fastener that is threaded into the aperture 50A which also might be threaded to receive the pin. Generally, however, the pin can be placed through the aperture of the zero stop ring after the zero stop ring is positioned over the guide sleeve such as the pin aperture is aligned with the guide groove 62. When the pin 62 is extended through the aperture and fully engaged with the zero stop ring 50, that pin is disposed in the guide groove and can limit rotation of the zero stop ring relative to the guide sleeve. In some applications, however, the guide sleeve can include a pin installation slot 67S. This pin installation slot 67S can allow the pin 52 or projection to be moved through that slot until the projection overlaps or lays within the guide groove 62. When it is within the guide groove 62, the pin 62 and the ring 50 can be rotated relative to the sleeve 60 and the threads 50T and 60T to threadably engage with one another. To remove the zero stop ring 50 from the sleeve 60, the projection 52 again can be aligned with the installation slot 67S and moved out of the guide groove 62 via the installation pathway IP shown in FIG. 10.

Optionally, the projection or pin 52 can be in the form of a tab (not shown) that is welded or integrally formed with the ring and projects from the interior surface 50I. Although shown projecting a distance upward from the lower edge 50ML, in some instances, the pin or projection 52 can be disposed at that lower edge 50L. As shown, however, it is disposed a distance D10 above the lower edge 50L of the ring.

The zero stop ring 50 can have a cylindrical inner surface 50I that is disposed around the guide groove 62 and the axis of rotation TA1 in general. The projection 52 can extend inwardly, generally toward the axis of rotation TA1. The zero stop ring 50 can be rotatably mounted relative to the guide sleeve 60. The zero stop ring and the guide sleeve also can be threadably coupled to one another. For example, the guide sleeve can include sleeve threads 60T. The zero stop ring 50 can include ring threads 50T. The ring threads can threadably engage the sleeve threads. Optionally, threads 50T and 60T can be oriented such that as the zero stop ring 50 is rotated in direction CW, which optionally can be clockwise, the ring 50 can thread onto the sleeve 60. As a result, the lower edge 50L of the ring 50 can move toward the lower edge 60L of the sleeve. As this occurs, the projection 52 rotates about the axis of rotation TA1. The sleeve 60, however, is held in a fixed position, by attachment to the base 20. The projection thus moves within the guide groove 62 along an arcuate path. Optionally, this arcuate path can be a helical path HP (FIG. 10) about the axis of rotation TA1.

The projection 52 can continue to rotate about the axis of rotation TA1 as the ring 50 is rotated relative to the sleeve 60. As this rotation occurs, the interior end 52E of the projection glides or moves over groove bottom 62C which again can be cylindrical. Optionally, the end 52E does not contact the bottom 62C of the groove. In some limited applications, it might contact that groove and slide in a low friction manner across it. The rotation of the ring and projection can be stopped or terminated when the projection contacts or engages the zero stop limiter 63 in the contact surface 63C. Again, upon this engagement, the zero stop can be set and the turret can be arranged so that the turret cover attains the configuration shown in FIG. 8 which can be visible to a user of the scope when the scope is mounted to a weapon. Upon rotation, for example, in direction CW, the threads 50T move relative to the sleeve threads 60T, and the ring 50 moves closer to the tube or scope body 3 to which the turret 10 is joined as shown in FIG. 2.

Again, it will be noted that the rotation of the zero stop ring 50, and thus the movement of the projection 52 within the guide groove 62 can be affected by the turret cover 14 interfacing with the zero stop ring 50 such that the zero stop ring 50 rotates in unison with the turret cover 40 while the zero stop ring 50 moves axially along or parallel to the axis of rotation TA1. However, during such movement, the turret cover can remain fixed along the axis of rotation, that is, not moving axially along it. During this movement of the zero stop ring 50, it moves axially along the axis of rotation TA1. When the turret is in a zero stop setting mode, the lower surface 50L of the stop ring 50 moves toward the scope body 3, while the cover and its upper surface remain at a fixed distance from the scope body. For example, as shown in FIGS. 2, 6 and 8, the upper surface 40U of the turret cover 40 remains at the fixed distance D7 during the zero stop setting mode. The zero stop ring 50, however, rotates and moves axially along the axis of rotation TA1 toward the scope body 3. As shown in FIG. 6, the lower surface 50L is disposed a first distance D11 from the scope body 3. After the turret cover and scope ring undergo the zero stop setting mode, the lower surface 50L is disposed a distance D12 from the scope body 3. This distance D12 is less than the distance D11.

Figure 7:
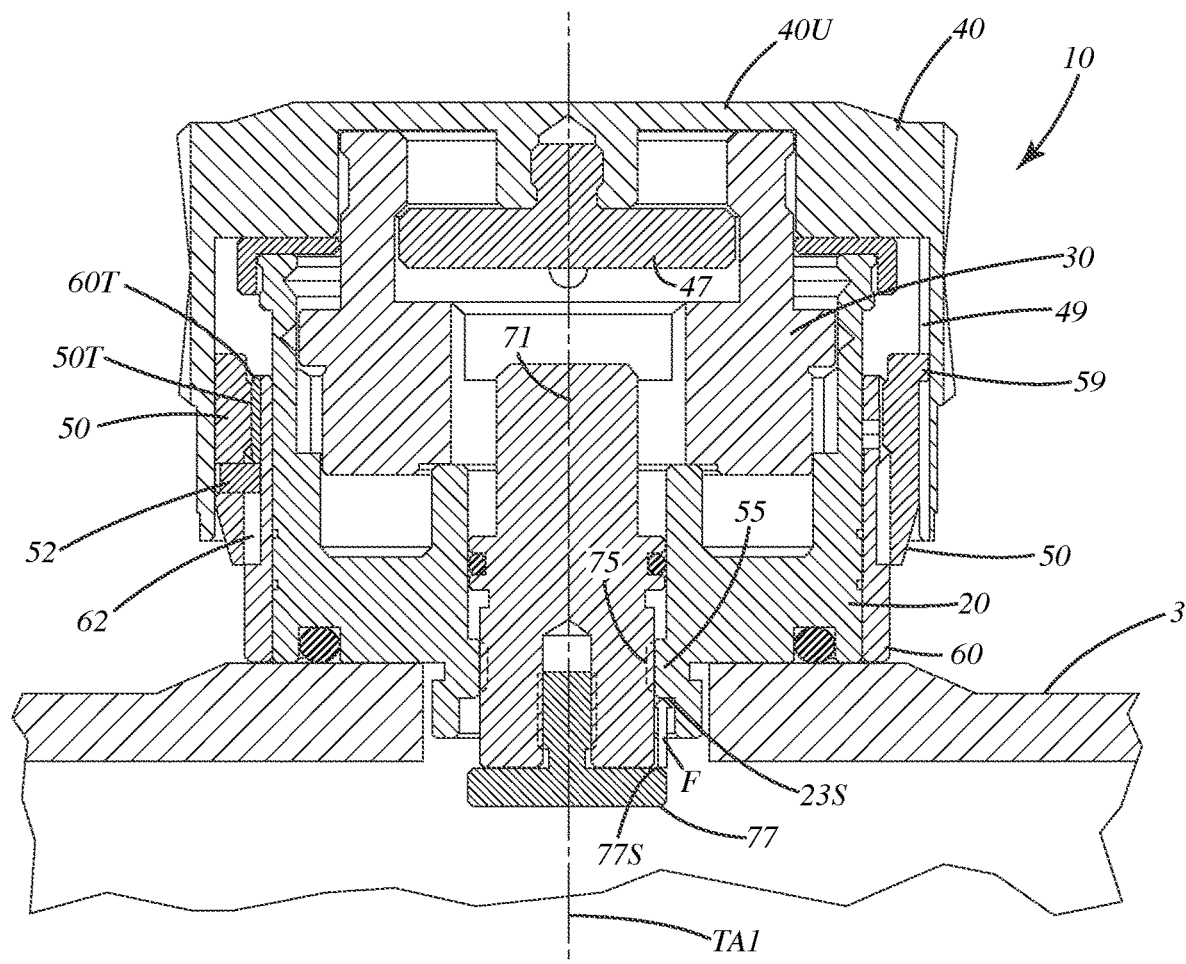
FIG. 7 is a cross section of the turret before the turret initiates the zero stop setting mode taken along line 7-7 of FIG. 6.

In an adjustment mode of the turret, for example, when a user is engaging targets at longer distances, the user rotates the turret cover 40 in direction CCW, while engaged and coupled directly to the collar assembly 30, so that the two rotate in unison, along with the zero stop ring 50. Optionally, the zero stop ring 50 and projection 52 can stop or terminate rotation of these components about the axis of rotation TA1. For example, in some applications, when the projection engages the upper shoulder 62S1 of the guide groove 62, that engagement will cease, terminate, or limit rotation of the turret cover, and thus further rotation of the turret in the opposite direction CCW. In other applications, rotation of these components can be stopped or terminated when the turret is adjusted to an extent that it meets the extreme limits of the adjustment of the movable body 4. For example, as shown in FIG. 7, when the turret cover 40 is rotated enough that the shoulder or flange 77S moves in direction F, via movement of threads 75 relative to threads 55, until the shoulder of flange 77S engages the shoulder 23S, then rotation of the turret cover 40 and the other components coupled to it, such as the adjustment screw, zero stop ring and projection, will cease as well.

Further optionally, the guide groove and zero stop limiter, as well as the projection in some cases can be reversed and disposed on different components. For example, the projection can extend from the inner sleeve or base, while the guide groove and zero stop limiter can be disposed on the interior surface 50I of the zero stop ring 50.

A method of using the scope 2 and turret 10 of the current embodiments will now be described. In general, a method of setting the zero stop of the scope can include providing a turret comprising a base, a turret cover graspable by a user, a zero stop limiter immovable relative to the base, a zero stop ring around a guide groove, and a projection movable within the guide groove; and rotating the turret cover and the zero stop ring in unison, while the turret cover remains coupled to the base, about an axis of rotation, so that the projection moves within the guide groove until the projection engages the zero stop limiter to establish a zero stop of the turret.

Optionally, the method can correspond to the sighting in of a rifle to which the scope 2 is joined. The user can use the turret 10 to adjust for elevation until the sighting element 9, such as a center of a reticle, corresponds with a point of impact of a projectile such as a bullet fired from the weapon to which the scope is mounted. After the sight-in is complete, the user can enter the turret into a zero stop setting mode. In this mode, the turret 40 initially appears as shown in FIG. 6, which is from a view of a user viewing the rear of the scope and the turret. In this mode, the zero stop numeral, that is, "0", is not aligned with the base lap indicator 67, nor the lowest zero stop lap indicator element 68L. The user can loosen the turret cover 40 relative to the collar assembly 30 such that the turret cover rotates freely relative to the collar assembly.

As shown in FIG. 9, the user can loosen one or more fasteners 41 so that the turret cover no longer rotates with the collar assembly 30. The user then can rotate the cover, optionally in a clockwise CW direction as shown in FIG. 6. As this occurs, in the zero stop setting mode, the tab 59 engages with the slot 49 such that the turret cover 40 and zero stop ring 50 rotate in unison about the axis of rotation TA1 as described above.

Figure 13:
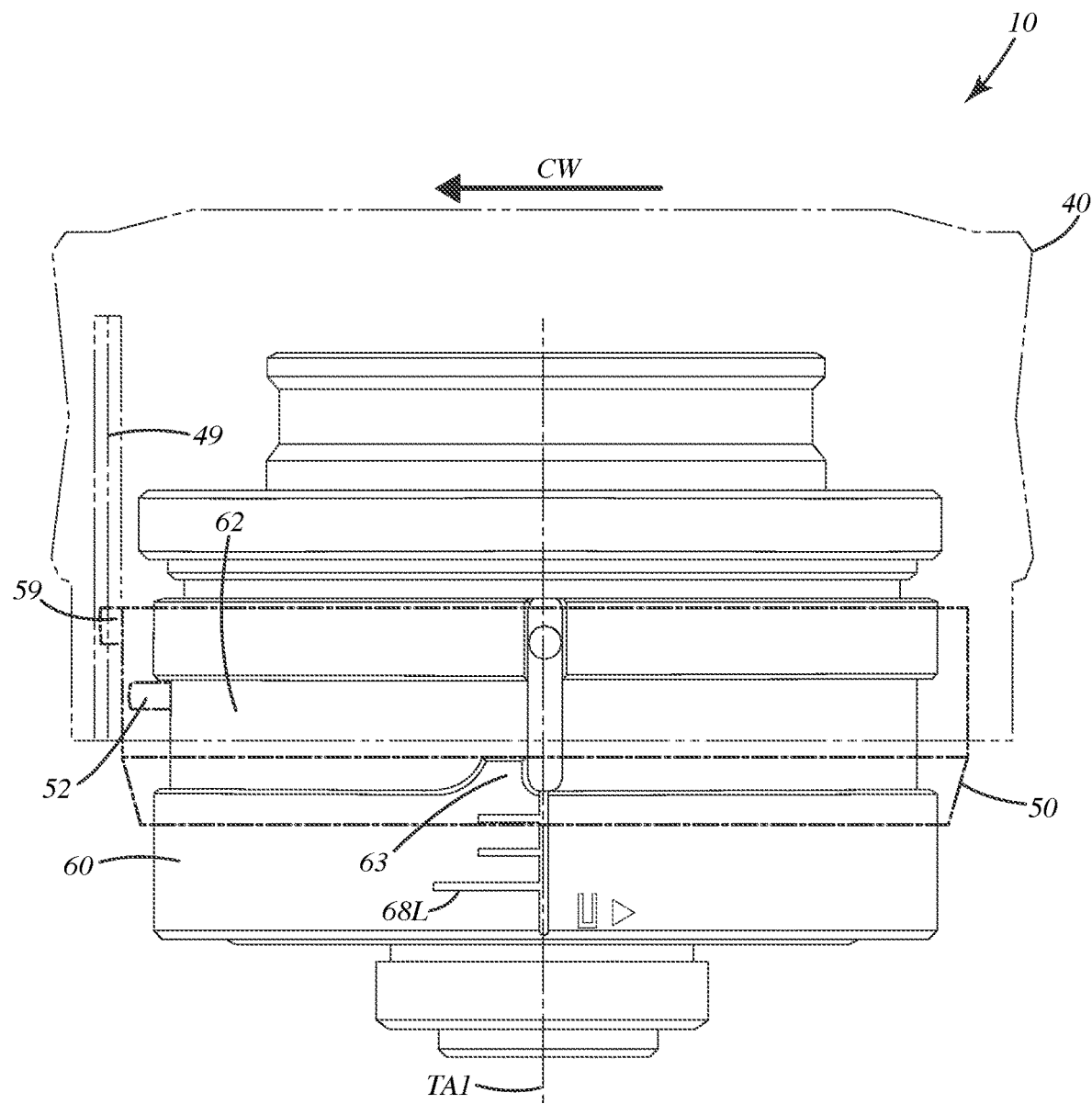
FIG. 13 is a partial section view of the turret continuing the zero stop setting mode.

As this rotation continues, the projection 52 extending inwardly from the ring 50 as shown in FIG. 12 also moves in direction CW within the guide groove 62 of the guide sleeve 60. As mentioned above, this rotation continues and as shown in FIG. 13, the tab 59 continues to engage the slot 49 of the turret cover such that the zero stop ring 15 continues to rotate. As this occurs, the projection 52 continues to move in an arcuate path around the axis of rotation TA1, generally circumferentiating that axis at a constant radial distance from that axis, within the groove 62. It will be noted that during this zero stop setting mode, the clicker assembly does not produce tactile and/or audible clicks because the collar assembly is not rotating with the turret cover and/or the zero stop ring.

Figure 14:
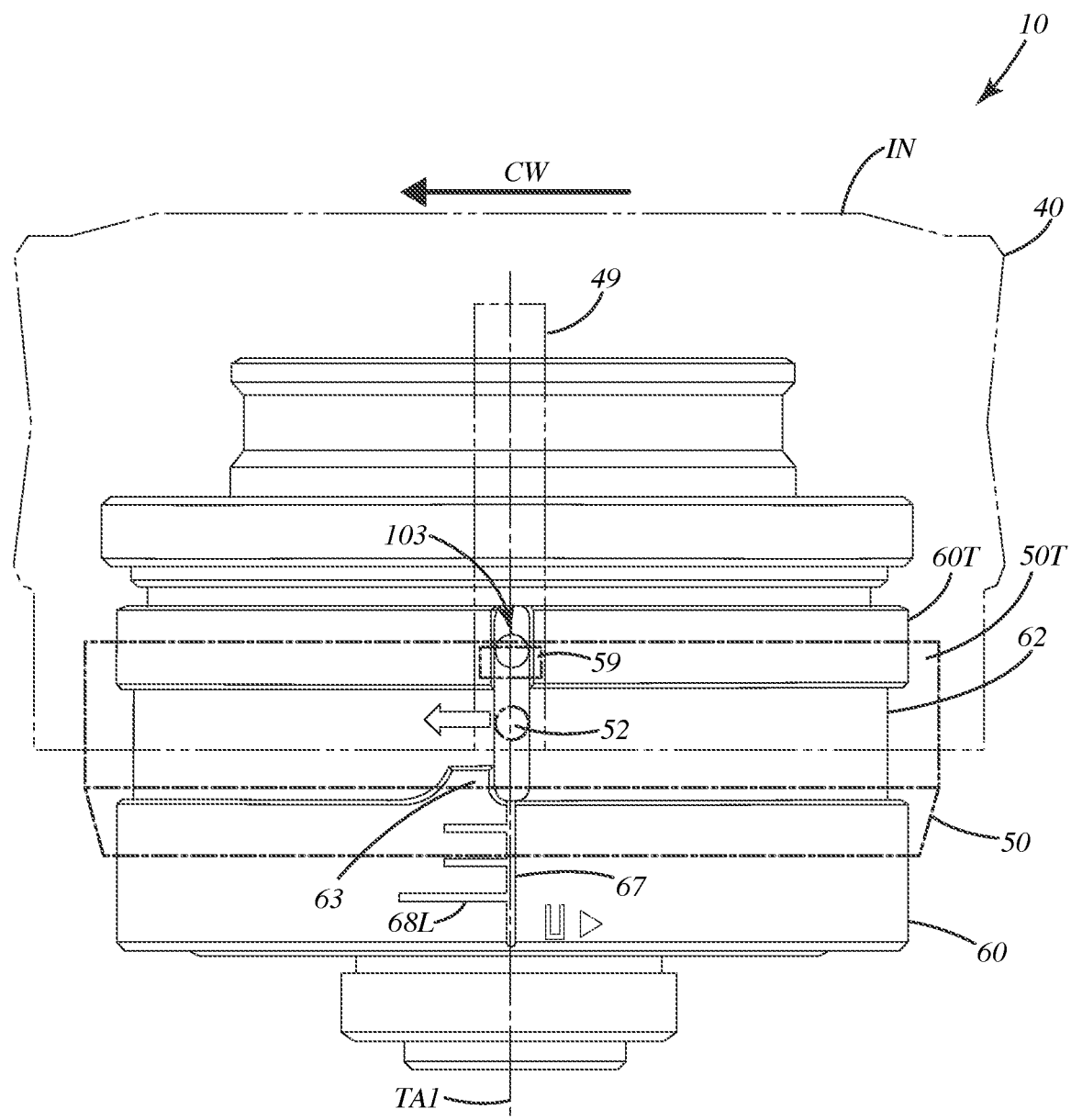
FIG. 14 is a partial section view of the turret further continuing the zero stop setting mode.

As shown in FIG. 14, the rotation continues in direction CW, with the user rotating the turret 40. This zero stop ring 50 also continues to rotate with turret cover 40, as the tab 59 slides downward in the slot 49 in direction D3. The ring threads 50T also continue to thread onto the sleeve threads 60T so that the zero stop ring moves axially along the turret access TA1, generally toward the scope body and or bottom of the base as described above. During this rotation, the turret cover 40 and its upper surface 40U also do not move axially along the turret axis TA1 or generally toward the scope body.

Figure 15:
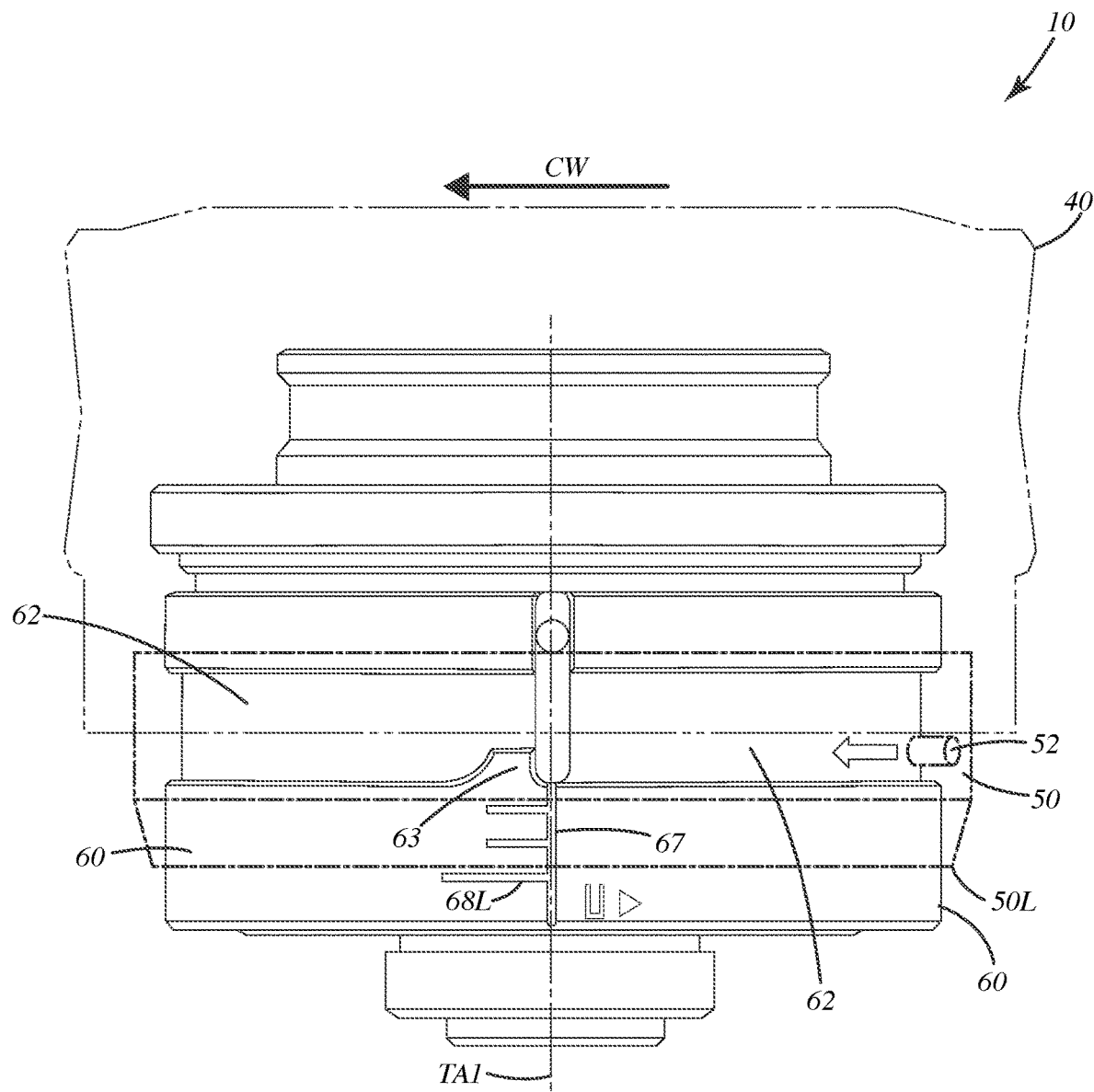
FIG. 15 is a partial section view of the turret yet further continuing the zero stop setting mode.

With reference to FIG. 15, the zero stop ring 50 continues to rotate and move downward, and come up with its lower edge 50L moving closer to the lowest lap counter indicia 68L. The projection 52 continues to rotate about the axis TA1, moving in a spiral or helical path within the groove as the cover 40 and zero stop ring 50 rotate in direction CW. This rotation continues until as shown in FIG. 16, the projection 52 engages the contact or stop surface 63C of the zero stop limiter 63 at the bottom of the groove 62. In this position, the turret cover, zero stop ring and projection are effectively limited from any further rotation in direction CW. In this position, the lower edge 50L of the zero stop ring 50 is aligned with the lower most lap counter indicia 68L. This position also corresponds to the configuration of the turret as shown in FIG. 8.

There, the reference number and marking 45ZN and 45ZM of a turret cover 40 are aligned with the base indicia element 67. In some cases, a user might rotate the turret cover 40 and the ring 50 several markings in direction CCW so that they can adjust their sighting element 9 slightly below a zero point. In this position, when the projection 52 engages the zero stop limiter 63, and/or the zero stop is ready to be set or being set or adjusted, the zero stop ring 50 and the projection 52 remain freely moveable, and the projection is not held stable against the zero stop limiter. Accordingly, the user can take care to not move or rotate the turret cover and/or the zero stop ring to avoid disengaging the projection from the limiter or otherwise removing the projection from a position against the zero stop limiter and its stop surface 63C.

After the zero stop is established, and/or the projection 52 is backed off the limiter 63 to a user's preference, the user can then recouple the turret cover 40 to the collar assembly and thus secure the projection in a fixed position relative to the adjustment shaft 70 and its screw. This can be accomplished by the user tightening the fasteners 41 to engage the collar assembly as shown in FIG. 9 so that the turret is returned to an adjustment mode in which rotation of the turret cover also rotates the collar assembly 30 and the adjustment shaft 70 to adjust the movable body 4 and thus the sighting element 9. When the zero stop is set, a user can rotate the turret cover and move the sighting element to adjust the scope for longer ranges. When the user wants to return the scope to the original zero point, the user can simply rotate the turret cover until the projection engages the zero stop limiter. When "0" on the turret cover faces the user, and the zero stop indicia element 45ZM is aligned with the vertical base indicia element 67, the projection 52 can be engaging and contacting the zero stop limiter 63, which can prevent any further downward adjustment of the adjustment shaft and/or adjustment of the sighting element 9. The scope is therefore reset to its original sight in range with this zero stop mechanism.

It will be appreciated that by identifying or naming herein certain elements as first, second, third, etc., that does not require that there always be a certain number of elements preceding, succeeding, above, below, adjacent and/or near the numbered elements. Further, any one of a numbered group of elements, for example, a third element, alternatively can be referred to as a first, second, fourth or other numbered elements. The same is true for the naming of any other elements in the form of a first element, second element, third element, etc., as used herein.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because a component, element or assembly is described herein as having a function does not mean its orientation, layout or configuration is not purely aesthetic and ornamental in nature.

Although the present description includes different embodiments, it will be appreciated that various elements, features, parts, components, assemblies, orientations, functions, and operations of one embodiment can be mixed and matched with one or more other embodiments. For example, one or more elements, features, parts, components, assemblies, orientations, functions, and operations of one embodiment can be readily combined with another embodiment, or several other embodiments piecemeal, which combination is fully contemplated and hereby disclosed.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to" or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law, including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The invention claimed is:

1. A turret for a weapon scope, the turret defining an axis of rotation and comprising:
   an adjustment shaft rotatable about the axis of rotation;
   a turret cover configured to be grasped by a user, the turret cover including a turret housing having an inner housing surface, with a first interface element on the inner housing surface;
   a guide sleeve extending around the axis of rotation, the sleeve defining a guide groove extending around the axis of rotation;
   a zero stop ring disposed around the guide sleeve and the guide groove, the zero stop ring including a second interface element that interfaces with the first interface element so that the zero stop ring and the turret cover rotate in unison, the zero stop ring including a projection extending radially inward toward the axis of rotation, the projection movably disposed in the guide groove; and
   a zero stop limiter extending within the guide groove so that the projection can engage the zero stop limiter extending within the guide groove to limit rotation of the turret cover.

2. The turret of claim 1,
   wherein the guide groove is defined in the guide sleeve at a constant radial distance from the axis of rotation so as to form a cylindrical groove bottom that extends around the axis of rotation,
   wherein the projection moves along a helical path around the axis of rotation within the guide groove with an interior end of the projection gliding over the cylindrical groove bottom as the zero stop ring and the turret cover rotate in unison.

3. The turret of claim 1,
   wherein the zero stop limiter projects radially away from the axis of rotation,
   wherein the zero stop limiter is disposed adjacent the guide groove,
   wherein the projection is arranged to engage the zero stop limiter when moving along an arcuate path as the zero stop ring and the turret cover rotate about the axis of rotation,
   wherein rotation of the turret cover and the zero stop ring is limited upon such engagement,
   wherein axial travel of the zero stop ring is limited upon such engagement.

4. The turret of claim 1,
   wherein the turret cover is operable in a zero stop setting mode in which the turret cover rotates with the zero stop ring until the projection engages the zero stop limiter, at which point, a zero marking indicia on the turret cover aligns in parallel with a lap count indicator base indicia, aligned with the axis of rotation, to indicate to the user that the turret cover is set at a zero stop point.

5. The turret of claim 1, comprising:
   a turret cover screw,
   wherein the turret cover screw rotationally couples the turret cover and the adjustment shaft in an adjustment mode,
   wherein the turret cover screw is rotatable to rotationally decouple the turret cover and the adjustment shaft in a zero stop setting mode,
   wherein the turret cover remains secured to the zero stop ring and a base and is capable of axial movement and rotational movement relative to the adjustment shaft in the zero stop setting mode.

6. The turret of claim 1 comprising:
   a base;
   a collar assembly rotatably mounted in the base;
   the adjustment shaft threadably joined with the base;
   a clicker assembly between the collar assembly and the base and configured to provide at least one of an audible click and a tactile click when the collar assembly rotates relative to the base;
   a screw projecting at least partially through the turret cover and configured to engage a screw notch defined by the collar assembly such that the turret cover can be selectively, rotationally joined with the collar assembly so that rotation of the turret cover rotates the collar assembly relative to the base causing the adjustment shaft to rotate relative to the base;
   wherein the base includes an outer perimeter, distal from the axis of rotation,
   wherein the guide sleeve is disposed around the outer perimeter,
   wherein the zero stop ring and the projection are disposed radially outward from the outer perimeter and the guide sleeve.

7. The turret of claim 1,
   wherein the projection is a pin that extends radially inward toward the axis of rotation,
   wherein the pin is seated in a pin aperture defined by the zero stop ring,
   wherein the guide groove includes a groove bottom,
   wherein the zero stop ring includes an interior wall that faces the groove bottom,
   wherein the pin extends from the interior wall toward the groove bottom, between the interior wall and the groove bottom.

8. The turret of claim 1, comprising:
   a base;
   a collar assembly rotatably mounted in the base; and
   a cover retainer joined with the turret cover such that the turret cover cannot be removed from the collar assembly without the use of tools, such that the turret cover remains joined with the base during a zero stop setting mode of the turret,
   wherein the turret is operable in the zero stop setting mode in which the turret cover free spins relative to the adjustment shaft such that the adjustment shaft remains stationary relative to the base, and such that the rotation of the turret cover rotates the zero stop ring until the projection engages the zero stop limiter.

9. A turret for a weapon scope, the turret defining an axis of rotation and comprising:
   an adjustment shaft rotatable about the axis of rotation;
   a turret cover configured to be grasped by a user, the turret cover including a turret housing having an inner housing surface, with a first interface element on the inner housing surface;
   a guide sleeve extending around the axis of rotation, the sleeve defining a guide groove extending around the axis of rotation;
   a zero stop ring disposed around the guide sleeve and the guide groove, the zero stop ring including a second interface element that interfaces with the first interface element so that the zero stop ring and the turret cover rotate in unison, the zero stop ring including a projection extending radially inward toward the axis of rotation, the projection movably disposed in the guide groove; and a zero stop limiter joined and arranged relative to the guide groove so that the projection can engage the zero stop limiter to limit rotation of the turret cover, wherein the first interface element on the inner housing surface is a slot that is parallel to the axis of rotation, wherein the second interface element is a tab slidably registered in the slot, wherein as the turret cover and zero stop ring rotate about the axis of rotation in unison, the tab moves axially in the slot in a direction parallel to the axis of rotation.

10. A turret for a weapon scope, the turret defining an axis of rotation and comprising:

an adjustment shaft rotatable about the axis of rotation;

a turret cover configured to be grasped by a user, the turret cover including a turret housing having an inner housing surface, with a first interface element on the inner housing surface;

a guide sleeve extending around the axis of rotation, the sleeve defining a guide groove extending around the axis of rotation;

a zero stop ring disposed around the guide sleeve and the guide groove, the zero stop ring including a second interface element that interfaces with the first interface element so that the zero stop ring and the turret cover rotate in unison, the zero stop ring including a projection extending radially inward toward the axis of rotation, the projection movably disposed in the guide groove; and a zero stop limiter joined and arranged relative to the guide groove so that the projection can engage the zero stop limiter to limit rotation of the turret cover, wherein the guide sleeve includes sleeve threads, wherein the zero stop ring includes ring threads engaging the sleeve threads, wherein the first interface and the second interface engage one another so that as the zero stop ring rotates in unison with the turret cover, the zero stop ring threads move relative to the sleeve threads, moving closer to a tube of the weapon scope to which the turret is securable.

11. A weapon scope comprising:

a scope body; and a turret joined with the scope body, the turret defining an axis of rotation and comprising:

an adjustment shaft rotatable about the axis of rotation and extending toward an interior of the scope body;

a base fixedly joined with the scope body;

a turret cover configured to be grasped by a user, the turret cover rotatably joined with the base;

a guide sleeve extending around the axis of rotation, the sleeve defining a guide groove;

a zero stop ring disposed around the guide sleeve and the guide groove, the zero stop ring including a projection extending radially inward toward the axis of rotation, the projection movably disposed in the guide groove; and a zero stop limiter joined with the zero stop ring and arranged to extend into the guide groove so that the projection can engage the zero stop limiter extending into the guide groove to limit rotation of the turret cover;

wherein the turret is operable in a zero stop setting mode in which the turret cover free spins relative to the adjustment shaft such that the adjustment shaft remains stationary relative to the scope body, and such that rotation of the turret cover rotates the zero stop ring until the projection engages the zero stop limiter.

12. The weapon scope of claim 11, wherein the zero stop limiter is a shoulder that projects from a lower wall of the guide groove, wherein the projection is a pin projecting radially inward toward the axis of rotation from an interior surface of the zero stop ring, wherein the interior surface is cylindrical in shape.

13. The weapon scope of claim 11, wherein the guide groove includes a groove bottom, wherein the groove bottom includes a cylindrical shape that completely extends around the axis of rotation.

14. A weapon scope comprising:

a scope body; and a turret joined with the scope body, the turret defining an axis of rotation and comprising:

an adjustment shaft rotatable about the axis of rotation and extending toward an interior of the scope body;

a base fixedly joined with the scope body;

a turret cover configured to be grasped by a user, the turret cover rotatably joined with the base;

a guide sleeve extending around the axis of rotation, the sleeve defining a guide groove;

a zero stop ring disposed around the guide sleeve and the guide groove, the zero stop ring including a projection extending radially inward toward the axis of rotation, the projection movably disposed in the guide groove; and a zero stop limiter joined with the zero stop ring and arranged relative to the guide groove so that the projection can engage the zero stop limiter to limit rotation of the turret cover;

wherein the turret is operable in a zero stop setting mode in which the turret cover free spins relative to the adjustment shaft such that the adjustment shaft remains stationary relative to the scope body, and such that rotation of the turret cover rotates the zero stop ring until the projection engages the zero stop limiter, wherein the turret cover defines a slot and includes a cover upper surface, wherein the zero stop ring includes a tab that is slidably disposed in the slot, wherein the tab slides in the slot with the tab moving away from the cover upper surface, as the turret cover and the zero stop ring rotate.

15. A weapon scope comprising:

a scope body; and a turret joined with the scope body, the turret defining an axis of rotation and comprising:

an adjustment shaft rotatable about the axis of rotation and extending toward an interior of the scope body;

a base fixedly joined with the scope body;

a turret cover configured to be grasped by a user, the turret cover rotatably joined with the base;

a guide sleeve extending around the axis of rotation, the sleeve defining a guide groove;

a zero stop ring disposed around the guide sleeve and the guide groove, the zero stop ring including a projection extending radially inward toward the axis of rotation, the projection movably disposed in the guide groove; and a zero stop limiter joined with the zero stop ring and arranged relative to the guide groove so that the projection can engage the zero stop limiter to limit rotation of the turret cover;

wherein the turret is operable in a zero stop setting mode in which the turret cover free spins relative to the adjustment shaft such that the adjustment shaft remains stationary relative to the scope body, and such that rotation of the turret cover rotates the zero stop ring until the projection engages the zero stop limiter, wherein the zero stop ring includes ring threads, wherein the guide sleeve includes sleeve threads, wherein the ring threads thread to the sleeve threads, wherein the turret cover is unthreaded and slidably coupled to the zero stop ring so the turret cover and zero stop ring rotate in unison.

16. A weapon scope comprising:
a scope body; and
a turret joined with the scope body, the turret defining an axis of rotation and comprising:
 an adjustment shaft rotatable about the axis of rotation and extending toward an interior of the scope body;
 a base fixedly joined with the scope body;
 a turret cover configured to be grasped by a user, the turret cover rotatably joined with the base;
 a guide sleeve extending around the axis of rotation, the sleeve defining a guide groove;
 a zero stop ring disposed around the guide sleeve and the guide groove, the zero stop ring including a projection extending radially inward toward the axis of rotation, the projection movably disposed in the guide groove; and
 a zero stop limiter joined with the zero stop ring and arranged relative to the guide groove so that the projection can engage the zero stop limiter to limit rotation of the turret cover;
wherein the turret is operable in a zero stop setting mode in which the turret cover free spins relative to the adjustment shaft such that the adjustment shaft remains stationary relative to the scope body, and such that rotation of the turret cover rotates the zero stop ring until the projection engages the zero stop limiter,
wherein rotation of the turret cover threads the zero stop ring onto the guide sleeve so the zero stop ring and projection move toward the scope body as the projection rotates about the axis of rotation at a constant radial distance from the axis of rotation.

17. A weapon scope comprising:
a scope body; and
a turret joined with the scope body, the turret defining an axis of rotation and comprising:
 an adjustment shaft rotatable about the axis of rotation and extending toward an interior of the scope body;
 a base fixedly joined with the scope body;
 a turret cover configured to be grasped by a user, the turret cover rotatably joined with the base;
 a guide sleeve extending around the axis of rotation, the sleeve defining a guide groove;
 a zero stop ring disposed around the guide sleeve and the guide groove, the zero stop ring including a projection extending radially inward toward the axis of rotation, the projection movably disposed in the guide groove; and
 a zero stop limiter joined with the zero stop ring and arranged relative to the guide groove so that the projection can engage the zero stop limiter to limit rotation of the turret cover;
wherein the turret is operable in a zero stop setting mode in which the turret cover free spins relative to the adjustment shaft such that the adjustment shaft remains stationary relative to the scope body, and such that rotation of the turret cover rotates the zero stop ring until the projection engages the zero stop limiter,
wherein the turret cover is coupled to the zero stop ring via a tab movably disposed in a slot so that the turret cover and the zero stop ring rotate in unison, and the zero stop ring moves axially along the axis of rotation while the turret cover remains at a fixed axial position along the axis of rotation.

18. A method of setting a zero stop of a weapon scope, the method comprising:
 providing a turret comprising a base, a turret cover graspable by a user, a zero stop limiter immovable relative to the base, a zero stop ring extending around a guide groove into which the zero stop limiter extends, and a projection movable within the guide groove; and
 rotating the turret cover and the zero stop ring in unison, while the turret cover remains coupled to the base, about an axis of rotation, so that the projection moves within the guide groove until the projection engages the zero stop limiter, extending into the guide groove, within the guide groove, to establish the zero stop of the weapon scope.

19. A method of setting a zero stop of a weapon scope, the method comprising:
 providing a turret comprising a base, a turret cover graspable by a user, a zero stop limiter immovable relative to the base, a zero stop ring extending around a guide groove, and a projection movable within the guide groove;
 rotating the turret cover and the zero stop ring in unison, while the turret cover remains coupled to the base, about an axis of rotation, so that the projection moves within the guide groove until the projection engages the zero stop limiter to establish the zero stop of the weapon scope; and
 moving a tab on the zero stop ring within a slot parallel to the axis of rotation and defined by the turret cover as the turret cover and zero stop ring rotate in unison.

20. The method of claim 19,
wherein the tab and the slot are centered on a first zero mark indicia disposed on an exterior surface of the turret cover,
wherein the first zero mark indicia passes a second zero mark indicia while the turret cover and the zero stop ring rotate in unison about the axis of rotation,
wherein the zero stop ring moves toward a scope body of the weapon scope to which the turret is joined, while the turret cover remains a fixed distance from the scope body of the weapon scope, as the turret cover and zero stop ring rotate in unison.

* * * * *